United States Patent
Banse et al.

(10) Patent No.: US 10,257,098 B1
(45) Date of Patent: *Apr. 9, 2019

(54) CREDIT MECHANISMS FOR PACKET POLICING

(71) Applicant: Amazon Technologies, Inc., Seattle, WA (US)

(72) Inventors: Mark Anthony Banse, Austin, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 606 days.

This patent is subject to a terminal disclaimer.

(21) Appl. No.: 14/983,185

(22) Filed: Dec. 29, 2015

(51) Int. Cl.
| H04L 12/813 | (2013.01) |
| H04L 12/803 | (2013.01) |
| H04L 12/851 | (2013.01) |
| H04L 29/06 | (2006.01) |
| H04L 12/815 | (2013.01) |

(52) U.S. Cl.
CPC ............ *H04L 47/20* (2013.01); *H04L 47/125* (2013.01); *H04L 47/23* (2013.01); *H04L 69/22* (2013.01)

(58) Field of Classification Search
CPC ..... H04L 47/20; H04L 47/123; H04L 47/125; H04L 47/23; H04L 69/22
See application file for complete search history.

(56) References Cited

U.S. PATENT DOCUMENTS

| 6,046,979 | A | * | 4/2000 | Bauman | H04L 47/10 370/229 |
| 6,594,701 | B1 | * | 7/2003 | Forin | G06F 12/1081 707/E17.036 |
| 7,237,016 | B1 | * | 6/2007 | Schober | G06F 15/02 709/223 |
| 2003/0223369 | A1 | * | 12/2003 | Anderson | H04L 12/5602 370/235 |
| 2007/0275711 | A1 | | 11/2007 | Buti et al. | |

(Continued)

OTHER PUBLICATIONS

U.S. Appl. No. 14/983,182, filed Dec. 29, 2015, Title: Pipelined Packet Policer.

(Continued)

*Primary Examiner* — Rasheed Gidado
(74) *Attorney, Agent, or Firm* — Kilpatrick Townsend & Stockton LLP

(57) ABSTRACT

Provided are systems and methods for packet policing for controlling the rate of a packet flows. In some implementations, an integrated circuit is provided. The integrated circuit may comprise a memory, a counter, and a pipeline. The integrated circuit may be operable to, upon receiving packet information describing a packet, determine, using the pipeline, a drop status for the packet. Determining the drop status may include determining a previous number of credits available, a number of new credits available, a current number of credits available, and a number of credits needed to transmit the packet. The drop status may be determined by comparing the number of credits needed to transmit the packet against the current number of credits available. The integrated circuit may further update the information stored for a policing context in the memory based on the drop status and the number of credits needed to transmit the packet.

24 Claims, 11 Drawing Sheets

(56) References Cited

U.S. PATENT DOCUMENTS

| | | | | |
|---|---|---|---|---|
| 2008/0037499 A1* | 2/2008 | Kumar | ............... | H04W 40/02 |
| | | | | 370/342 |
| 2012/0239833 A1* | 9/2012 | Yoshimura | ............. | G06F 3/06 |
| | | | | 710/52 |
| 2015/0350089 A1* | 12/2015 | Wang | .................. | H04L 47/20 |
| | | | | 709/224 |

OTHER PUBLICATIONS

Aboul-Magd, O. and S. Rabie, "A Differentiated Service Two-Rate, Three-Color Marker with Efficient Handling of in-Profile Traffic," Network Working Group, RFC 4115 (Jul. 2005), 7 pages.

* cited by examiner

CREDIT MECHANISMS FOR PACKET POLICING

BACKGROUND

Packet policing may be used to control the rate at which a flow of packets traverses a network. In some cases, packet policing may be used to control a user's use of a network, so that one user is not able to dominate a network's resources, and/or is not able to use more bandwidth than he has been allocated. Packet policing may also be used to limit the rate of a certain class or type of packets. For example, storage accesses may be policed so as to avoid the network being overwhelmed by a large volume of storage accesses. Packet policing may also be used to control the rate of packets flowing to a specific point within a device, such as for example to a processor.

BRIEF DESCRIPTION OF THE DRAWINGS

Various embodiments in accordance with the present disclosure will be described with reference to the drawings, in which.

DETAILED DESCRIPTION

Figure 1:
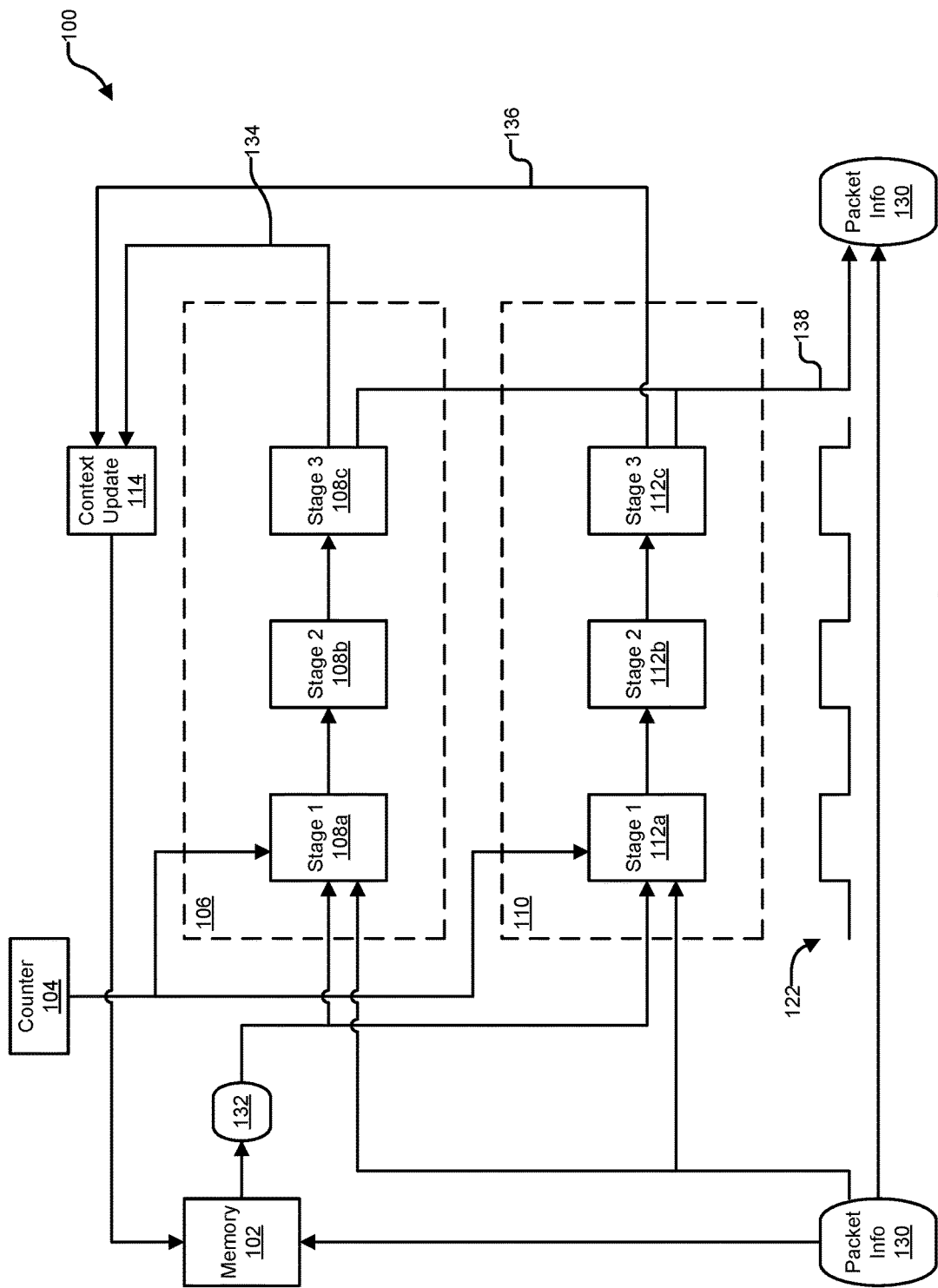
FIG. 1 illustrates an example of a method for packet policing, implemented in this example as an integrated circuit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Packet policing, which may also be referred to as rate limiting, may be used to control a flow of packets across a network. A flow of packets or a packet flow (or, more simply, a flow) is a series of related packets typically with a common source and destination. For example, a data stream from a website—which may include text, audio, video, and/or information in various other formats—to a specific user's computer may be described as a packet flow.

In some cases, packet policing may be used to control a user's use of a network, so that one user is not able to dominate a network's resources, and/or is not able to use more bandwidth that he has been allocated. For example, in a cloud computing environment, a user of cloud computing resources may have purchased a specific amount of bandwidth. As packet traffic to and from the user crosses the network supporting the cloud environment, the network may need to ensure that the user is not using more bandwidth than he has paid for. Packet policing may also be used to limit the rate of a certain class or type of packets. For example, in an enterprise network, the network owner may want to limit certain types of traffic, such as for example video streams or storage accesses, to balance the load across the network, limit the flow of packets in certain parts of the network, or for some other reason.

Packet policing may be implemented at various points in a network. For example, packet policing may be implemented at the "edges" of a network, that is, where server systems connect to the network. Policing at the edges of the network may provide control over the rate of packets entering the network, and/or may be used to limit the burden on a server by limiting the rate of packets entering the server. Alternatively or additionally, policing may occur at the switches and routers that connect the various nodes of a network. Policing at switches and routers may provide dynamic control over the load at specific points in the network. Policing at the switches and routers can also be dynamically turned on and off to allow free flow of packets.

Packet policing may be based on the size of the packets in a flow or the number of packets in a flow, or by some other measure. For example, the rate of packets may be measured in bytes per second. Policing based on packet size may be used to restrict a packet flow to a certain bandwidth. As another example, the rate of packets may be measured in packets per second. Policing based on packets per second may be useful where a packet flow consists of many small packets. A denial of service attack is an example of a packet flow that may include many small packets, where the bandwidth used by the packets may not be high, but the number of packets may overload a system. A denial of service attack that may be thwarted by limiting the rate of the packet flow by the number packets received per second.

In some implementations, packet rate (in bytes per second, bits per second, packets-per-second, or some other measure) is tracked using credits. A particular packet flow may be awarded a certain number of credits that are equivalent to the flow's allowed rate. For example, a flow that is restricted to 10 MBps (megabytes-per-second) may be awarded 1,000,000 credits per second (or 1000 credits per millisecond), with each credit being worth 10 bytes. Credits are said to be tracked in a "bucket," a term commonly used to describe a type of counter, here used to count credits. The bucket fills as new credits are added, and empties as credits are consumed. When credits are used faster than they are added, the bucket can reach zero credits. Typically, buckets also have a maximum value, and once the maximum value of credits have been added to the bucket, any additional new credits are discarded.

Each packet in a flow may be said to consume a certain number of credits. For example, assuming a bucket configured to allow packets to be forwarded at a rate of 10 MBps, with each credit being worth 10 bytes, a packet that is 100 bytes in size may use up 10 credits. When the bucket has more than 10 credits in it, then the packet's status may be set to "forward," meaning the packet can continue on its way. Ten credits would also be removed from the bucket. But when the bucket has fewer than 10 credits, then the packet's status may be set to "drop," meaning the packet may be dropped rather than being allowed to continue. In this case, no credits would be removed from the bucket. Assuming another packet that is 100 bytes in size is received for policing, this packet's status would also be set to "drop," and the status for any further packets this size would also be set to "drop" until the bucket is replenished with additional credits.

In some implementations, a circuit may be configured such that each packet flow has its own credit bucket. Alternatively or additionally, a bucket may be shared between packet flows. Alternatively or additionally, a packet flow may use two or more buckets, and in some cases when the first bucket does not have enough credits, the next bucket is checked, if that bucket does not have enough credits, the next bucket is checked, and so on. In other cases, the multiple buckets may be checked in parallel, and if any of the buckets have credits, the packet's status may be set to "forward."

Traditionally, credits have been added to buckets in chunks and at fixed intervals. For example, 1000 credits may be added every second. While simple to implement, adding credits in this way may result in less than accurate rate limiting. For example, a packet flow may consume all available credits before the expiration of a second, leading to a momentary burst during which the flow may be using more than its allowed rate. The flow may then run out of credits, and briefly suffer a large number of packet drops until the bucket is replenished. Over time, the packet flow's net rate may be the desired rate, but over short intervals the flow's rate may be greater or lower.

Packet policing may be made more efficient by dividing the credit calculation and the drop-or-forward determination into smaller steps, and having the individual steps be executed in the stages of a pipeline. Pipelines provide ability to operate on multiple packets on each cycle of a clock, with each packet being operated on in a separate stage of the pipeline. In some cases, however, a pipeline may not be able to police two packets at the same time when those two packets are using the same credit bucket. Typically, a packet enters the pipeline with the "latest" information about the number of credits in the bucket, and generally the bucket is not updated until the end of the pipeline, when it is determined whether there are sufficient credits in the bucket to forward the packet. But when a first packet reaches the last stage in the pipeline and updates the bucket, a second packet may already be in the pipeline, and with credit information that does not take into account any credits consumed by the first packet. It may be necessary, in these situations, to stall the pipeline, and prevent the second packet from entering the pipeline until the first packet completes. Stalling the second packet, however, may prevent any packets from entering the pipeline until the stall is lifted.

Pipelining the packet policing process may also limit the ability to update the context or state of the bucket. For example, when packets are in the pipeline and software wants to update the state of the bucket being used by those packets, typically software has to allow the packets to drain from the pipeline. Software may also have to then stop the policing logic so that no additional packets enter the pipeline that will use the bucket that is being updated.

Pipelining the packet policing process, however, may provide some distinct advantages, and a more accurate method of awarding credits may reduce or eliminate the above-described limitations. Provided herein is a pipeline packet policer that employs policing contexts. A policing context may be a container for the state of one or more buckets, as well as information about the rate limiting being used by the policing context, and state information about the policing context itself. A feedback path from the last stage of the pipeline may also be provided and used to maintain the accuracy of prior stages in the pipeline. Also provided is a method for nearly cycle-accurate accounting of credits using a free-running counter. Credits may be awarded on each cycle of a clock, based on the counter value. The pipeline may also be enabled to provide live software updates of the policing context. Live software update means that the pipeline need not be stopped when software wants to update a policing context.

In most hardware implementations, a counter is not able to count to infinity, but rather is limited to certain number of bits, and then rolls over to zero. For example, a 4-bit counter may count from zero to fifteen, and then restart at zero. A credit award system that relies on a counter that can roll over may lead to a policing context having an inaccurate credit count when the bucket or buckets in the policing context are not used for the interval spanning the counter's maximum value. Thus, provided herein, are systems and methods for credit maintenance. Policing contexts may be periodically checked, and if the policing context has not been used for a period of time then the bucket or buckets in the context may be automatically updated.

I. Packet Policing

Packet policing may be implemented in network adapters used to connect a host device to a network, and by routers and switches that form the structure of the network. The network may be designed to support tens of terabytes worth of throughput, with individual links supporting up to 100 Gbps (gigabits per second) to 400 Gbps or more. At these speeds, packet policing may be most efficiently implemented in an integrated circuit, such may be found in an Application Specific Integrated Circuit (ASIC), Field Programmable Gate Array (FPGA), Complex Programmable Logic Device (CPLD), or the like.

FIG. 1 illustrates an example of a method for packet policing, implemented in this example as an integrated circuit 100. The circuit 100 includes a memory 102, a free-running counter 104, one or two pipelines 106, 110 each with multiple stags 108a-c, 112a-c, and optional context updating logic 114. The circuit 100 may have a clock 122 input, and in most cases the operation of the circuit 100 is coordinated with the rising and/or falling edges of the clock 122.

The memory 102 may be used to store policing contexts. A policing context may contain values that describe the current state of one or more credit buckets, values related to calculating credits, and/or values related to the policing context itself (e.g., whether the policing context is enabled). The policing contexts stored in the memory 102 may be indexed by a policer identifier. The policer identifier may be included in packet information 130, which may also be referred to as packet metadata, or just metadata. Packet information describes a packet, and may include information such as the packet's size, the type and size of headers included in the packet, source and destination addresses for the packet, a packet class or type, a current drop status for the packet, and so on. Packet information for a packet may typically occupies fewer bytes than the packet itself. Packet information may thus be used as a smaller and more easily handled proxy for the packet. In most cases, the packet itself is not received by the circuit 100.

A policer identifier may be added to the packet information by additional logic not illustrated here. A policer identifier may be assigned based on values found in the packet information 130, values such as an input and/or output port, a source and/or destination Internet Protocol (IP) and/or Media Access Control (MAC) address, an Ethernet type, an IP protocol, various flags, a traffic class, a virtual local area network (VLAN) identifier, or some other value, or a combination of these values. In some implementations, all packets in one flow may be assigned the same policer identifier, so that these packets use the same policing context. In some implementations, multiple flows may use the same policing context. In some implementations, packets with the same traffic type or class, which may be from different flows, may use the same policing context.

Packet information 130 may enter the circuit 100 at each cycle of the clock 122. The policer identifier from the packet information 130 may be used to read a specific policing context 132 from the memory. The policing context 132 may be provided to the first stage 108a, 112a, of each of one or more pipelines 106, 110. The values from the policing context 132 provided to the first stage 108a are, in most cases, the values read from the memory 102 at or near the time the packet information 130 is received. These values are not typically continuously read from the memory 102 into each stage 108a-c of the pipeline. Instead, the values that enter stage 1 108a are typically advanced into the next stage 108b, and continue through the rest of the pipeline 106. Thus the values from the policing context used in each stage 108a-c of the pipeline reflect the state of those values at a certain time.

Also provided to the first stage 108a, 112a of each of the pipelines 106, 110 is the current value of the counter 104. The counter 104 may be "free running," which means that counter 104 increments at every clock cycle (or every other clock cycle, or at some multiple of the clock cycle) without any stimulus other than the clock. In this example circuit 100, the counter 104 may be used to determine how many clock cycles have passed since the specific policing context 132 was used. As explained in further detail below, the number of credits are awarded to buckets in the policing context may be based on this number of clock cycles.

The two pipelines 106, 110 in this example circuit are illustrated as having three stages. A pipeline "stage" may be described as operations that occur during one cycle of the clock 122. Furthermore, at the end (or beginning) of each clock cycle, some or all of the values operated upon—and any results of those operations—are moved to the next stage of the pipeline. For example, at a first clock cycle, the packet information 130 may be operated upon in stage 1 108a of the first pipeline 106. At a second clock cycle, the packet information 130 may be moved to stage 2 108b of the pipeline 106, to be operated upon by logic in stage 2 108b. In some implementations, each stage 108a-c includes registers at the inputs and/or outputs of the stage 108a-c for storing values, and on each cycle of the clock 122 those values are pushed to the registers in the next stage 108a-c. The term often used for storing data in a register is that the data is "latched" into the register. At each cycle of the clock, new packet information may be latched into the registers for the first stage 108a, and so the example three-stage pipelines 106, 110 may be operating on the packet information for up to three packets at a time.

In this example circuit 100, the first pipeline 106 is configure to determine a drop-or-forward status for a packet. To make this determination, the policing context 132 may provide the first pipeline 106 with a credit bucket. In some implementations, this credit bucket may be called the Committed Rate Bucket. The credit bucket may be configured with a rate, which, in some implementations, may be called a Committed Information Rate. The Committed Information Rate may indicate the amount of data that may be forwarded per second. The credit bucket may also be configured with a maximum number of credits, which, in some implementations, may be called the Committed Burst Size. The Committed Burst Size may indicate the maximum number of credits the bucket can hold.

When new packet information 130 arrives, the credit "cost" of the packet may be determined. The cost of the packet is the number of credits needed to transmit the packet, measured in bytes, number of packets, or some other measure. The number of credits needed to transmit the packet may be compared against the current number of credits available in the bucket (e.g., the Committed Rate Bucket). When the bucket has a sufficient number of credits, a status in the packet information 130 is set 138 to indicate that the packet can be forwarded, and the number of packets needed to transmit the packet are removed from the bucket. When the bucket has an insufficient number of credits, the status in the packet information 130 is set 138 to indicate that the packet should be dropped. In this case, no credits are removed from the bucket.

The operations required to determine the drop-or-forward status of a packet may be divided among the stages of the first pipeline 106 in various ways. For example, stage 1 108a may be configured to determine the new number of credits accrued since the last time the policing context 132 was used. Stage 1 108a may also be used to determine the number of credits needed to transmit the packet describe by the packet information 130.

Continuing the example, stage 2 108b may be configured to determine a current number of credits available, which may include both the new number of credits accrued, as well as a previous number of credits available. In other words, at stage 2 108b, the pipeline 106 may determine the number of credits in the bucket, which includes the number of the credits that were already in the bucket and the number of credits that can be added to the bucket due to the passage of time.

Continuing the example, stage 3 108c may be configured to determine the drop status for the packet, which may include comparing the current number of credits available in the bucket against the number of credits needed to transmit the packet. At the conclusion of stage 3 108c, the policing context 132 may be updated 134. For example, when the drop status for the packet described by the packet information 130 is to forward the packet, the number of credits needed to transmit the packet may be subtracted from the bucket, resulting in a next number of credits available in the bucket. This next number of credits available may be written to the memory 102. In some implementations, all the values contained in the policing context 132 are also written back to the memory 102. When the drop status for the packet described by the packet information 130 is to drop the packet, no credits are deducted from the bucket, but the bucket now has had added to it the new number of credits accrued. The policing context's 132 information in the memory 102 would be updated 134 with this information.

The first pipeline 106 may include more or fewer stages than are illustrated in this example circuit 100. For example, the circuit 100 may include an additional stage for extracting information from the packet information 130, such as the policer identifier and possibly a packet size, and presenting this information to the memory 102. As another example, the circuit may also include an additional stage for reading the policing context 132 from the memory, and presenting the policing context 132 to the input of the first stage 108*a*. The illustrated stages 108*a-c* may also be combined into fewer stages, or may be divided into sub-stages.

As noted, this example circuit 100 includes a second pipeline 110. In some implementations, the policing context 132 may be configured to use a dual credit bucket algorithm. A dual credit bucket algorithm means that the policing context 132 includes values describing a second credit bucket. In some implementations, this second bucket may be called the Peak Rate Bucket. The second bucket may further be configured with its own rate indicating an amount of data that may be forwarded, which, in some implementations, may be called the Peak Information Rate. The second bucket may also have a maximum number of credits the bucket can hold, which, in some implementations, may be called the Peak Burst Size. When the policing context 132 is configured with two buckets, the policing context 132 may have a value that indicates whether one bucket or two buckets are to be used to determine the drop-or-forward status of the packet described by the packet information 130. Alternatively or additionally, the packet information 130 may indicate whether one bucket or both buckets should be used.

When the policing context 132 is configured with two credit buckets, the first pipeline 106 operates and usual, and provides a drop-or-forward status for the packet described by the packet information 130, based on the credit values associated with the first bucket. In parallel, the second pipeline 110 may make the same determination, using credit values associated with the second credit bucket. Generally, when the first pipeline 106 determines that the first bucket does not have sufficient credits to transmit the packet, the circuit 100 may then check whether there are sufficient credits in the second bucket; that is, the circuit 100 checks the drop-or-forward status produced by the second pipeline 110. When the second bucket has sufficient credits, the status for the packet is set 138 to forward the packet. Otherwise, the status is set 138 to drop the packet. In most implementations, the second pipeline 110 may need to provide a drop-or-forward result in the same number of clock cycles as the first pipeline 106. Thus, the stages 112*a-c* in the second pipeline 110 may be the same as the stages 108*a-c* in the first pipeline 106.

In some implementations, the policing context 132 may be configured with two credit buckets, but for some or all packets may further be configured to only use the first credit bucket. In these implementations, the second bucket may be sent through the second pipeline 110 anyway, typically with a packet size of zero, in order to update bucket with new credits accrued.

In cases where both pipelines 106, 110 are used, the values for both credit buckets may need to be updated in the policing context 132. As noted previously, the values for the buckets are both stored in the one policing context 132. In some implementations, the circuit 100 may include context updating logic 114. The context updating logic 114 may combine the updated values 134, 136 from both pipelines 106, 110 into a single write request to the memory 102. Without the context updating logic 114, the circuit 100 may instead write the values 134, 136 for the policing context 132 into the memory 102 with two write requests.

In various implementations, the policer circuit 100 may include only one pipeline 106, or may include more than two pipelines, with each pipeline operating on a different credit bucket. The different credit buckets may each be consulted sequentially, that is, if a bucket does not have enough credits to forward a packet, then if the next bucket does have enough credits, the packet will be forwarded. Alternatively or additionally, one or more buckets may be consulted in parallel, that is, if any bucket has enough credits, then the packet will be forwarded. A dual credit bucket algorithm is described in Request for Comment (RFC) 4115.

Not all packets whose packet information is provided to the policer circuit 100 are policed. In some cases, the packet information may not have a policer identifier. Alternatively or additionally, the policing context identified by a policer identifier may have been disabled. Alternatively or additionally, the a drop status in the packet information 130 may already indicate that the packet should be dropped when the packet information 130 is received, in which case the policer circuit 100 may be configured to skip the packet described by the packet information 130. For practical reasons, the circuit 100 may be in the processing path for all packets passing through a switch or router, and it may have been determined that some packet traffic does not need to be rate limited. Packets that may be identified, using their packet information, as not being policed may pass through the circuit 100 without any of the pipeline 106, 110 operations being triggered.

The example circuit 100 can be used for both policing data packets traversing a network, and for policing control packets being routed to a processor or processors. For data packets, the policer circuit 100 may be determining whether to drop the packet, or forward the packet to its next stop in the network, and/or to its ultimate destination. For policing control packets being sent to a processor, the policer circuit 100 may be limiting the number of packets that the processor has to receive. In various implementations, a processor or processor core may be included in the same circuit, package, or chip as the policer circuit 100. Alternatively, a processor or processors may be in on the same board or in the same chassis as the chip that include the policer circuit 100. Packets passing through the network device may be routed to the processor for special analysis. For example, packets with unknown destination addresses may be examined by the processor prior to the destination address being added to a list of known destinations. Policing packets being directed to the processor may protect the processor from being overloaded. For example, a denial of service attack may attempt to overload a processor by sending a stream of packets with unknown destination addresses, each of which would need to be examined by the processor. Policing this stream of packets may allow only a few of these packets to reach the processor, and cause the rest to be dropped.

Figure 2:
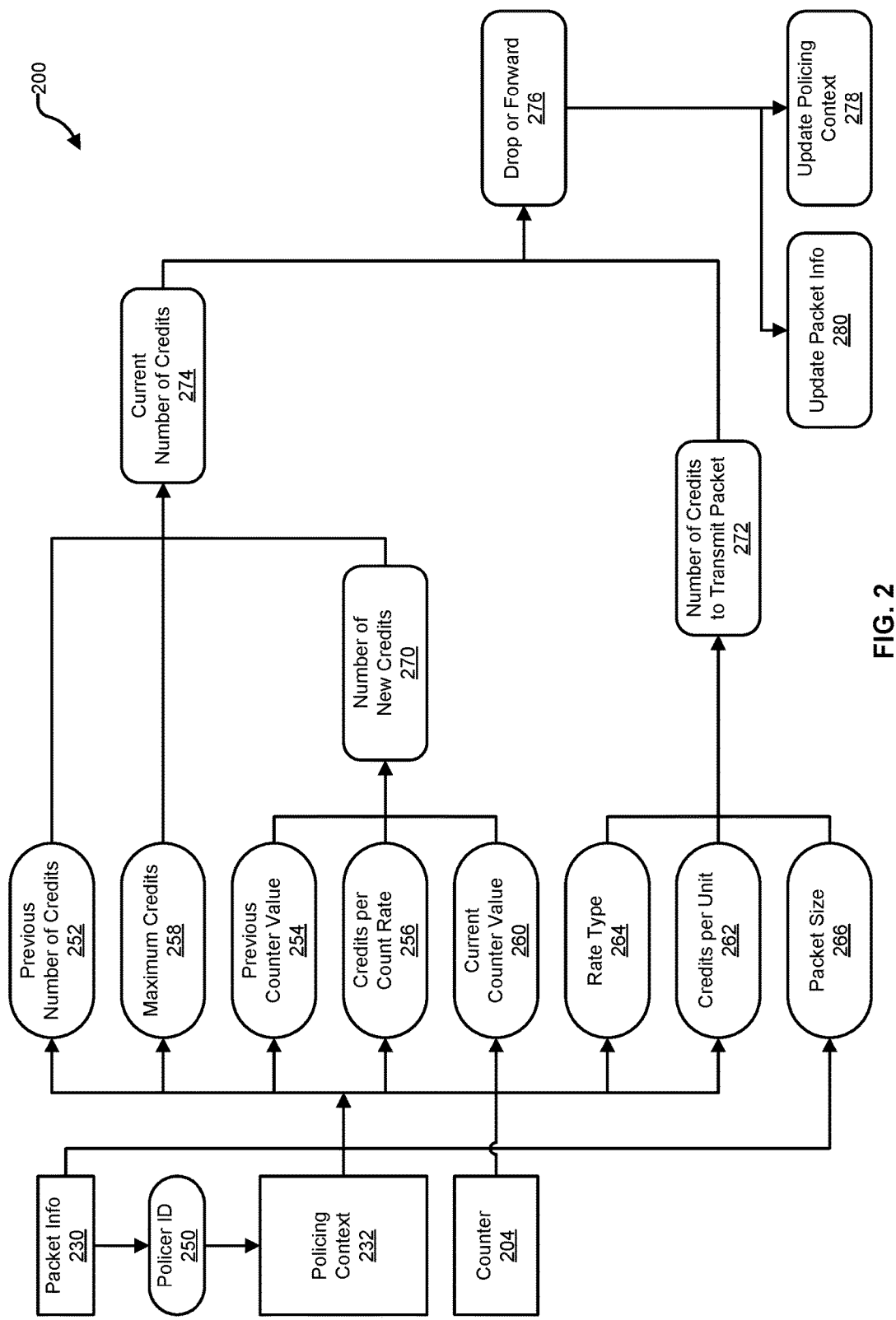
FIG. 2 illustrates an example of values that may be included in a policing context, and an example of a process for using those values to determine the drop-or-forward status for a packet.

FIG. 2 illustrates an example of values that may be included in a policing context 232, and an example of a process 200 for using those values may to determine the drop-or-forward status 276 for a packet. The example process 200 may be implemented using an integrated circuit, such as for example the integrated circuit 100 illustrated in FIG. 1.

The process 200 of FIG. 2 begins when packet information 230 describing a packet is received. The packet information 230 may include a policer identifier 250. The policer identifier 250 may be used to read a specific policing context 232 that may be stored, for example, in a memory. The policing context 232 may include the following values, each of which will be described in turn: a previous number of credits 252, a maximum credits 258, a previous counter value 254, a credits per count rate 256, a rate type 264, and a credits per unit 262. In various implementations, the policing context 232 may include other values, or fewer values. The process 200 may also involve values produced by a counter 204 that increments on every cycle of a clock.

To determine the drop-or-forward status 276 for the packet described by the packet information 230, the process 200 may determine a current number of credits 274 in the bucket and the number of credits needed to transmit the packet 272 that is described by the packet information 230.

Determining the current number of credits 274 in the bucket may first involve determining a number of new credits 270 accrued since the last time the policing context 232 was used. Determining the number of new credits 270 may involve the previous counter value 254 and the credits per count rate 256, along with a current counter value 260 provided by the counter 204. The previous counter value 254 may be the value the counter 204 had the last time the policing context 232 was accessed. For example, previous counter value 254 may be "10" and the current counter value 254 may be "20," meaning that ten clock cycles have passed since the last time the policing context 232 was used. The credits per count rate 256 may be the number of credits that are awarded for each increment of the counter 204. For example, assuming a clock that is driving the counter at 1 GHz (gigahertz), and assuming that the policing context 232 is configured to allow a rate of 1000 MBps, the credits per count rate 256 may be one credit per count. Incorporating the previous example, this may mean that ten new credits have accrued since the last time the policing context 232 was used. The number of new credits 270, in this example, is thus ten.

The current number of credits 274 in the bucket may be determined using the number of new credits 270 accrued, and the previous number of credits 252 and the maximum credits 258 values provided by the policing context 232. The previous number of credits 252 may be the number of credits in the bucket after the last time the policing context 232 was used. For example, the previous number of credits 252 may be 485, meaning that there were 485 credits in the bucket after the policing context 232 was last used. The maximum credits 258 may be the maximum number of credits that can be added to the bucket. For example, the maximum credits 258 may be 500, and once the bucket contains 500 credits any additional new credits may be dropped.

The number of new credits 270 accrued may be added to the previous number of credits 252 contained in the bucket to produce the current number of credits 274. For example, continuing the prior examples, the number of new credits 270 may be ten and the previous number of credits 252 may be 485, which means the current number of credits is 495. The maximum credits 258, however, may limit the number of credits that can be added to the bucket. For example, if the maximum number of credits is 500, the previous number of credits 252 is 495, and the number of new credits 270 is ten, the current number of credits 274 may only go as high as 500, and five credits will be discarded.

Prior to, concurrent with, or after determining the current number of credits 274, the process 200 may also determine the number of credits needed to transmit the packet 272. Determining the number of credits needed to transmit the packet 272 may involve a rate type 264 and a credits per unit 262 value provided by the policing context 232. The packet information 230 may also provide a packet size 266. The rate type 264 may indicate how the packet described by the packet information 230 is to be policed. For example, the rate type 264 may be in bytes per second. In this case, the credits per unit 262 value may indicate how many credits each byte is worth. For example, every 10 bytes may be worth one credit, and assuming that the packet size 266 is 100 bytes, the number of credits to transmit the packet 272, for this example, would be 10 credits.

Alternatively, the rate type 264 may be in packets per second. When such is the case, then the credits per unit 262 value may be set to a credit cost per packet, typically one, two, five, or some other integer value. The packet size 266 is usually treated as one, such that the number of credits needed to transmit the packet 272 may be provided by the credit cost per packet indicated by the credits per unit 262 value. The rate type 264 may dictate measuring the number of credits needed to transmit the packet 272 in other ways, with the packet information 230 providing the appropriate information to make the calculation.

Once the current number of credits 274 and the number of credits needed to transmit the packet 272 have been determined, the process 200 may determine the drop-or-forward status 276 for the packet described by the packet information 230. Determining the drop-or-forward status 276 may involve comparing the number of credits needed to transmit the packet 272 against the current number of credits 274 in the bucket. When the current number of credits 274 in the bucket is greater than or equal to the number of credits needed to transmit the packet 272, then the packet's status may be set to "forward." Otherwise, the packet's status may be set to "drop." The packet's status may be recorded in the packet information 230, for use elsewhere.

Once the packet's drop-or-forward status has been determined, the process 200 may then update, at step 280, a drop-or-forward status stored in the packet information. In some cases, the status stored in the packet information is called "drop," such that a positive value indicates that the packet is to be dropped, while a negative value indicates that the packet is to be forwarded. In some cases, the drop-or-forward status in the packet information is already set to "drop", and a forward determination at step 276 may not alter this state.

Once the packet's drop-or-forward status has been determined, the process 200 may also update the policing context 278. The policing context 232 may be updated to reflect values that change as a result of determining the drop-or-forward status for the packet. For example, the current counter value 260 may be written over the previous counter value 254. As another example, the state of the bucket may be updated. When the packet's status is to forward the packet, the packet consumes credits, which may be deducted from the bucket. Specifically, the number of credits needed to transmit the packet 272 may be deducted from the current number of credits 274, and the resulting value may be stored in the policing context 232 as the next number of available credits in the bucket. The next time this particular policing context 232 is used, this next number of credits available may be used as the previous number of credits 252 available.

When the packet's status is to drop the packet, the packet may not consume any credits, but new credits may have been added to the bucket. Specifically, the current number of credits 274 may include the number of new credits 270 accrued. The current number of credits 274 may thus be stored in the policing context 230 as the next number of credits available. When this particular policing context is used again, the next number of credits available may be used as the previous number of credits 252 available.

As noted previously, the process 200 may be implemented by an integrated circuit, such as the integrated circuit 100 of FIG. 1. In some implementations, the steps of the process 200 may be implemented by the first pipeline 106, with each step implemented by one or more stages 108a-c of the pipeline 106. In some implementations, a pipeline stage 108a-c may implement all or part of more than one of the steps of the process 200. In most implementations, the same process 200 may be used by the second pipeline 110. As noted above, in most implementations, the stages 112a-c of second pipeline 110 execute the same operations as the stages 108a-c of the first pipeline 106. The second pipeline 110 may be implemented this way so that the results from both pipelines 106, 110 reach the final stage at the same time.

Using the example process 200 illustrated in FIG. 2, a policer circuit may be able to, at every clock cycle, determine relatively accurately the number of credits available in a bucket. In various implementations, the bucket state stored in the policer context, the counter, and the pipelined design of the circuit in various combinations may provide cycle-accurate accounting of credits. Thus the rate limiting for a flow may be fairly accurate not only over time, but also over short intervals.

Figure 3:
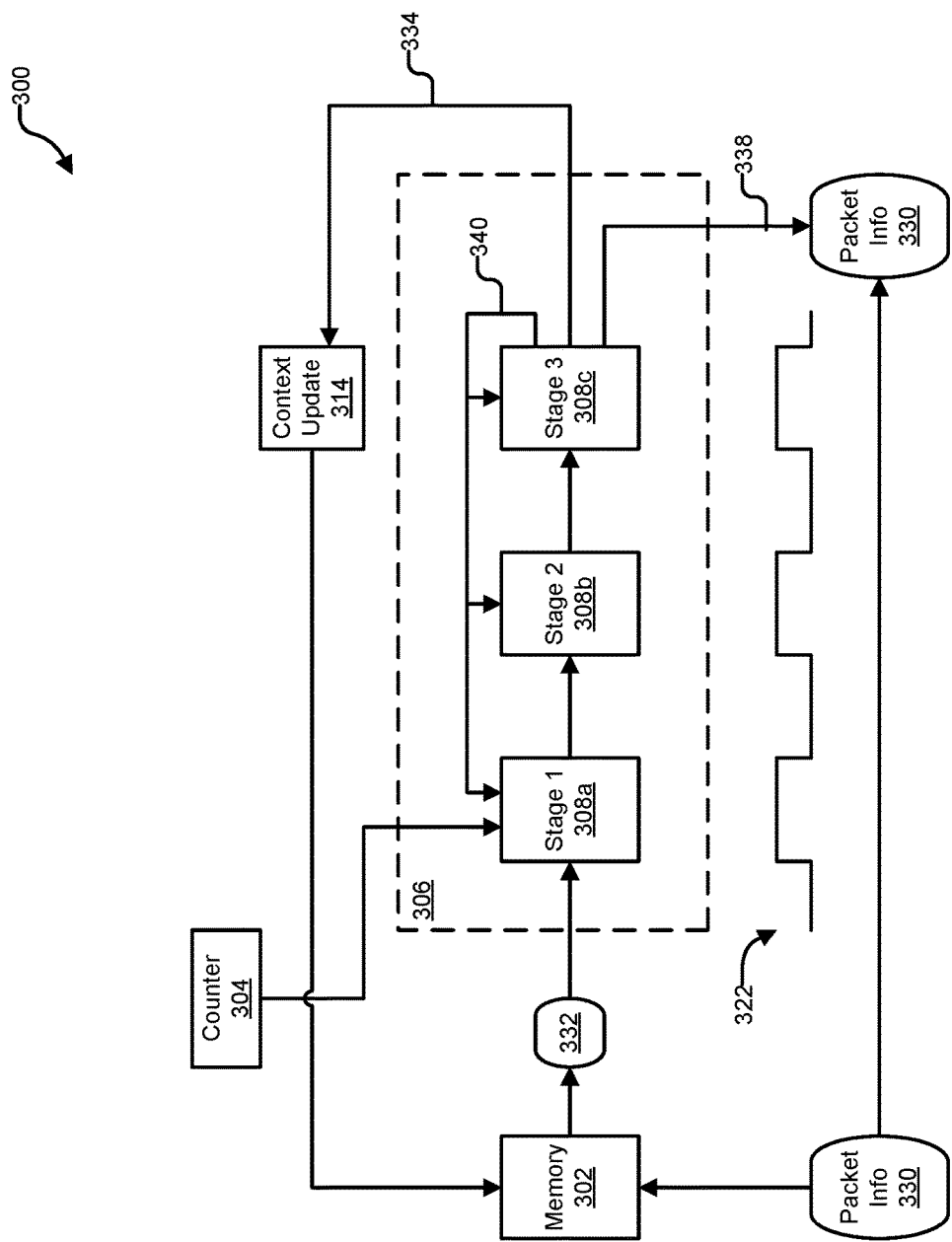
FIG. 3 illustrates an example of a packet policer circuit that includes feedback signals that may assist in maintaining the accuracy of the credit count at each stage of a pipeline.

As discussed earlier, the pipelined design of the policer circuit may also allow the circuit to police more than one packet at a time, with the packet information for a different packet being operated upon in each stage of the pipeline. In some cases, the packet information for two packets may have the same policer identifier. This packet information may arrive in consecutive clock cycles, so that two stages of the pipeline may be using the same policing context at the same time. FIG. 3 illustrates an example of a packet policer circuit 300 that includes feedback signals 340 that may assist in maintaining the accuracy of the credit count at each stage of a pipeline 306. The circuit 300 may include a memory 302, a free-running counter 304, a pipeline 306 with multiple stages 308a-c, and an optional context updating logic 314. The circuit may also have a clock input 322. The circuit 300 may include additional pipelines, but for the sake of clarity these are not illustrated here.

The memory 302 may be used to store policing contexts. Packet information 330 provided to the circuit 300 may include a policer identifier, which may be used to read a specific policing context 332 from the memory 302. The policing context 332 and the packet information 330 may be input into the first stage 308a of the pipeline 306, along with the current value of the counter 304. Each stage of the pipeline 308a-c operates on values provided by the policing context 332, the packet information 330, and the counter 304. At each cycle of the clock the data being operated on in each stage 308a-c, along with any possible results from those operations, may be advanced to the next stage 308a-c of the pipeline 306. At the last stage (in this example, stage 3 308c; in other implementations there may be more or fewer stages), the drop-or-forward status for the packet described by the packet information 330 may be determine and set 338 in the packet information. The drop-or-forward status may be determined according to the process 200 illustrated in FIG. 2. In FIG. 3, the last stage 308c may also update 334 the policing context 332 by writing some or all of the values for the policing context back into the memory 302. In some implementations, an optional context updating logic 314 may collect the updated policing context 332 data from multiple pipelines and produce a single write request for the memory 302.

New packet information 330 may be delivered at each cycle of the clock 322. In some cases, the packet information 330 for multiple packets may have the same policer identifier. When packet information 330 with the same policer identifier arrives at the circuit 300 within a few clock cycles of each other, it may be possible for multiple pipeline 306 stages 308a-c to be using values from the same policing context 332.

Having at least two pipeline 306 stages 308a-c use values from the same policing context 332 may be problematic because, as noted above, the policing context 332 may not be updated until the drop-or-fail determination is made in the last stage 308c of the pipeline 306. For example, assume that a first packet information is in stage 3 308c of the pipeline 306, and assume that a second packet information is in stage 1 308a, and further assume that the first and second packet information have the same policer identifier. When the first packet information arrived at the circuit 300, it may have been supplied with a previous credits available value of, for example, 50 when the policing context was read. When the second packet information arrived, it may also have been supplied with a previous credits available value of 50. The pipeline 306 may then have determined that the packet described by the first packet information is to be forwarded, which means that a number of credits are to be deducted from the bucket (say, ten). At the end of stage 3 308c, the policing context 332 may be updated 334 with the new credit count for the bucket, which in this example would be 40. Stage 1 308a, however, has the credit count provided when the memory 302 was read at about the time the second packet information entered stage 1 308a (in this example, 50) instead of the current credit value (in this example, 40). In other words, the values for the bucket at stage 1 308a may not account for the result of the drop-or-forward result for the first packet information, and thus may be out-of-date. Should the second packet information continue through the pipeline 306, the drop-or-fail status may not be determined accurately, and the policing context may not be updated 334 with correct values.

One solution to the problem of out-of-date data in earlier pipeline 306 stages 308a-c is to hold incoming packet information 330 while the policing context 332 that is indexed by the incoming packet information 330 is being used in the pipeline 306. Holding the incoming packet information 330 may allow the policing context 332 to be updated 334 before the incoming packet information 330 causes the policing context 332 to be read again. Holding incoming packet information 330, however, introduce artificial idle cycles into the pipeline 306. Holding incoming packet information 330 may also block incoming packet information for all packets.

Another solution may be to provide feedback signals 340 from the last stage 308c to previous stages 308a-b of the pipeline 306. For example, stage 2 308b of the pipeline 306 may be configured to determine a current number of credits available. The current number of credits available may include a new number of credits accrued since the last time the policing context 332 was used, as well as a previous number of credits in the bucket, provided by the policing context 332. A feedback signal 340 may provide the previous number of credits, because the stage 3 308c may have the most up-to-date number of credits in the bucket. That is, at stage 3 308c, the circuit 300 may deduct credits from (when a packet is to be forwarded) or add credits to (when a packet is to be dropped) the bucket. The feedback signal 340 may in this way avoid an out-of-date value for the previous number of credits from being used in stage 2 308b.

As another example, stage 1 308a of the pipeline 306 may be configured to determine, using the counter 304 and the policing context 332, a number of new credits accrued. While this stage 308a may not necessarily use the previous number of credits value from the policing context 332, this stage 308a has a copy of this value. This copy of the previous number of credits value would have been read from the memory 302, along with the rest of the policing context 332, at about the time the packet information 330 was presented to stage 1 308a. This copy may also be transferred to stage 2 308b at the next clock cycle, where the value may be used. Hence, a feedback signal 340 from stage 3 308c to stage 1 308a may be provided, so that stage 1 308a has an up-to-date version of the previous number of credits. Even if stage 1 308a does not itself use the previous number of credits value, a later stage may, and the feedback signal 340 may ensure that the value is up-to-date.

Using the feedback signals 340 illustrated in the example of FIG. 3, the circuit 300 may thus be able to concurrently police more than one packet that is using the same policing context.

Figure 4:
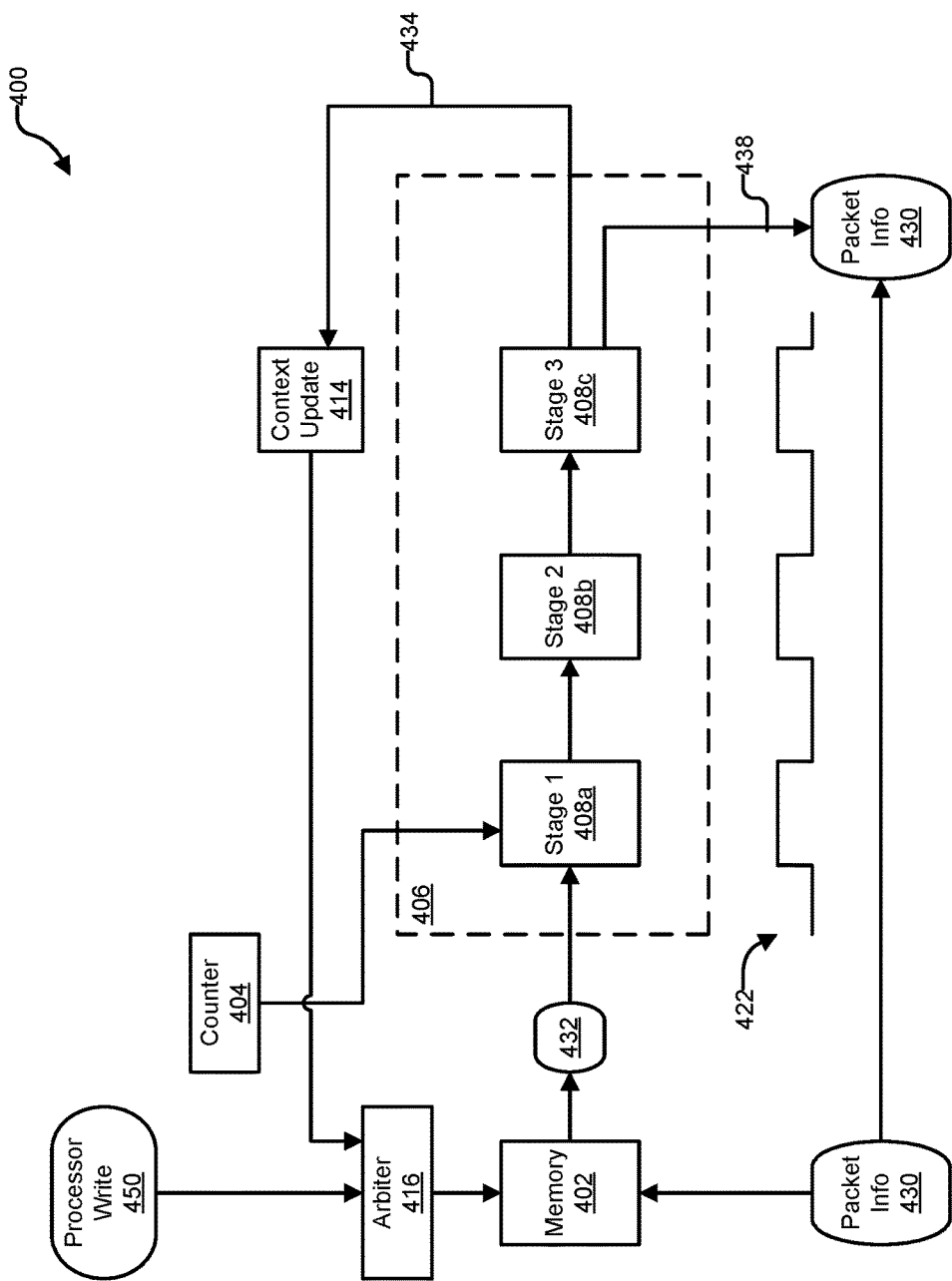
FIG. 4 illustrates an example of a packet policer circuit configured to allow live software updates of policing contexts.

Policing contexts may sometimes be modified by software running on a processor. For example, a network administrator may program a change to the rate for a particular flow, or may disable or enable a particular policing context. Processor writes, however, may interfere with packet policing when the processor issues a write request to a policing context that is in use by the pipeline. FIG. 4 illustrates an example of a packet policer circuit 400 configured to allow live software updates of policing contexts. The circuit 400 may include a memory 402, a free-running counter 404, a pipeline 406 with multiple stages 408a-c, and an optional context updating logic 414. The circuit 400 may also have a write arbiter 416 attached to a write port of the memory 402. The circuit may also have a clock input 422. The circuit 400 may include additional pipelines, but for the sake of clarity these are not illustrated here.

The memory 402 may be used to store policing contexts. Packet information 430 provided to the circuit 400 may include a policer identifier, which may be used to read a specific policing context 432 from the memory 402. The policing context 432 and the packet information 430 may be input into the first stage 408a of the pipeline 406, along with the current value of the counter 404. Each stage of the pipeline 408a-c operates on values provided by the policing context 432, the packet information 430, and the counter 404. At each cycle of the clock the data being operated on in each stage 408a-c, along with any possible results from those operations, may be advanced to the next stage 408a-c of the pipeline 406. At the last stage 408c, the drop-or-forward status for the packet described by the packet information 430 may be determined and set 438 in the packet information. The drop-or-forward status may be determined according to the process 200 illustrated in FIG. 2. In FIG. 4, the last stage 408c may also update 434 the policing context 432 by writing some or all of the values for the policing context 432 back into the memory 402. In some implementations, an optional context updating logic 414 may collect the updated policing context 432 data from multiple pipelines and produce a single write request for the memory 402.

The circuit 400 may receive write requests from a processor 450 to modify policing contexts in the memory 402. For example, a processor 450 write request may modify the packets per second rate allowed by policing context, or may disable or enable a policing context. The processor may be incorporated into the same circuit that includes the policer circuit 400, or may be in the same package, or may be on the same board, or may be within the same chassis.

A write request from the processor 450 may be modifying a policing context whose values are in use by the pipeline 406. After the processor 450 write, the values in use by the pipeline 406 may reflect only the pre-modification versions of the values. In some cases, the processor 450 write may arrive at the memory 402 at the same that the pipeline 406 is writing the memory 402 with updated values for the policing context. One method for avoiding this scenario is to halt further incoming packet information to allow the data being operated on in the pipeline 406 to drain out. Once the pipeline 406 has updated the policing context in memory and pipeline 406 is idle, the processor 450 write may then be allowed to complete. After that, that incoming packet information may be allowed to resume.

Another method for managing write requests from multiple sources is illustrated in the example of FIG. 4. The example circuit of FIG. 4 includes a write arbiter. The write arbiter 416 may arbitrate between various write requests directed to the memory 402. For example, the write arbiter 416 may accept write requests from the pipeline 406 and/or from a processor 450. Write requests from the pipeline 406 may serve to update the information for a policing context 432 that was just used by the pipeline 406 to determine the drop-or-fail status for a packet. For example, a write request from the pipeline 406 may update the current credit count in a bucket and/or the last counter 404 value. Write requests from the processor 450 may serve to modify the information for a policing context. For example, a write request from the processor 450 may change a rate value, to increase or decrease the rate at which packets assigned to the modified policing context are forwarded. As another example, a processor 450 write request may enable or disable a policing context by writing to an enable bit for the policing context. The write arbiter 416 may be connected to a write port of the memory 402.

In some implementations, the write arbiter 416 may determine whether write requests from the pipeline 406 or write requests from the processor 450, or both, will be allowed to go through to the memory 402. In some cases, a write request from the pipeline 306 may be to a different policing context than the policing context being written to by the processor 450. When this is the case, the write arbiter 416 may allow both write requests to reach the memory 402. In some cases, a write request from the processor 450 may be given priority. The processor 450 write may be given priority so that the policing context being modified by the processor 450 write is ready before any packet information 430 arrives that will use that policing context. In some cases, the write request from the pipeline 406 may be given priority, also so that the policing context being updated by the pipeline 406 write is up-to-date before it is used again.

In some cases, a write request from the pipeline 306 and a write request from the processor 450 are directed to the same policing context. In some cases, the write arbiter 416 may only allow the processor 450 write request go through to the memory 402. This may be the case when, for example, the processor 450 write request has the most up-to-date values for the policing context. In some cases, the write arbiter 416 may also allow at least part of the write from the pipeline to go through to the memory 402. This may be the case when, for example, the pipeline has the most up-to-date values for the state of a bucket. The write from the pipeline 406 may be allowed to modify values in the memory 402 that are related to the state of the bucket, and leave unmodified any other values in the policing context.

In some cases, the processor 450 may be writing to a policing context whose values are also in use by one or more stages 408a-c of the pipeline 406. The values from the policing context may be in use in an early stage 408a-c of the pipeline 406, so that a write request from the pipeline 406 to update the policing context may arrive after the write request from the processor 450. In this situation, the write arbiter 416 may allow the write request from the processor 450 to proceed to the memory 402, but the later write request from the pipeline may be all or partially blocked. This may avoid the pipeline 406 modifying the values for the policing context with out-of-date values.

In some implementations, in the situation where the processor 450 is writing a policing context whose values are in use by one or more pipeline 406 stages 408a-c, the operations of the pipeline 406 stages 408a-c may be allowed to continue, though the pipeline 406 stages 408a-c may now have old values for the policing context. Though the values from the policing context may be old, the resulting credit calculations are not necessarily incorrect, so allowing the packet information to being operated upon in the pipeline 406 would not result in inaccurate rate control. Subsequent packet information, which may use the updated values from the policing context, would start being policed, for example, at a new rate. In other implementations, any pipeline 406 stages 408a-c using values from a policing context that is being updated by a processor 450 write request may be flushed, and/or the packet information being operated on may automatically receive a drop (or forward) status. In these implementations, the circuit 400 may include additional logic to detect the need for a stage 408a-c to be flushed and to execute the flush.

As illustrated in the example of FIG. 4, use of a write arbiter 416 may assist the policer circuit 400 in managing write requests from a processor 450. The circuit 400 may further allow the processor 450 to update a policing context while that policing context is in use by the pipeline 406.

The information stored in memory for the policing contexts may also benefit from being updated in an automated fashion. As noted above, the number of new credits accrued to a bucket may be determined using free-running counter. A "free-running" counter is one that increments usually on every cycle of a clock, and has no external stimulus or controls (other than, perhaps, a reset signal). In most hardware implementations, a counter is implemented with a certain number of bits, and "rolls over" or goes to zero once the maximum value for the counter is reached. For example, an 8-bit counter is able to count to 255, or 0xFF in hexadecimal notation, and on the next count returns to zero. The term "rolls over" may also describe any time the counter counts more than its maximum value (e.g., assuming a starting value of 64, when an 8-bit counter counts 256 times and returns to 64, the counter is said to have rolled over).

As described above, a policer circuit may use a free-running counter to calculate a new number of credits accrued. Each policing context uses the counter to track the last time the policer context was used. When a policing context is next used, the circuit may use the difference between the current value of the counter and the previous value of the counter to determine how many new credits to add to a bucket. For example, the policing context may have "10" as the previous counter value and the current counter value may be "20", indicating that ten clock cycles have passed since this policing context was last used. Each cycle of the clock may be worth a certain number of credits, based on the frequency of the clock. For example, the clock frequency may be 1 GHz, and the policing context may be configured to allow 1000 MBps. In this example, each count indicated by the counter may be worth one credit.

Occasionally, a policing context may not be used for a long time. Since the free-running counter continues to increment, during this time it may be that the counter will roll over before the policing context is used again. As a result, the next time the policing context is used, the circuit may determine an inaccurate number of new credits accrued. For example, the policing context may have a previous counter value of 64. Assuming an 8-bit counter, the policing context may not be used until the counter has incremented 261 times, at which point the current counter value will be 70. Typically, logic that uses a fixed-width counter is able to accommodate the counter incrementing past zero (e.g., the previous counter value was 251 and the current counter value is 5; the circuit will be able to determine that the counter has incremented ten times). In some implementations, however, the circuit may be unable to track the occurrence of the roll over for each and every available policing context. Hence, in the above example, when the counter value is 70, for a given policing context the circuit may determine that six counts have passed, instead of 261.

Figure 5:
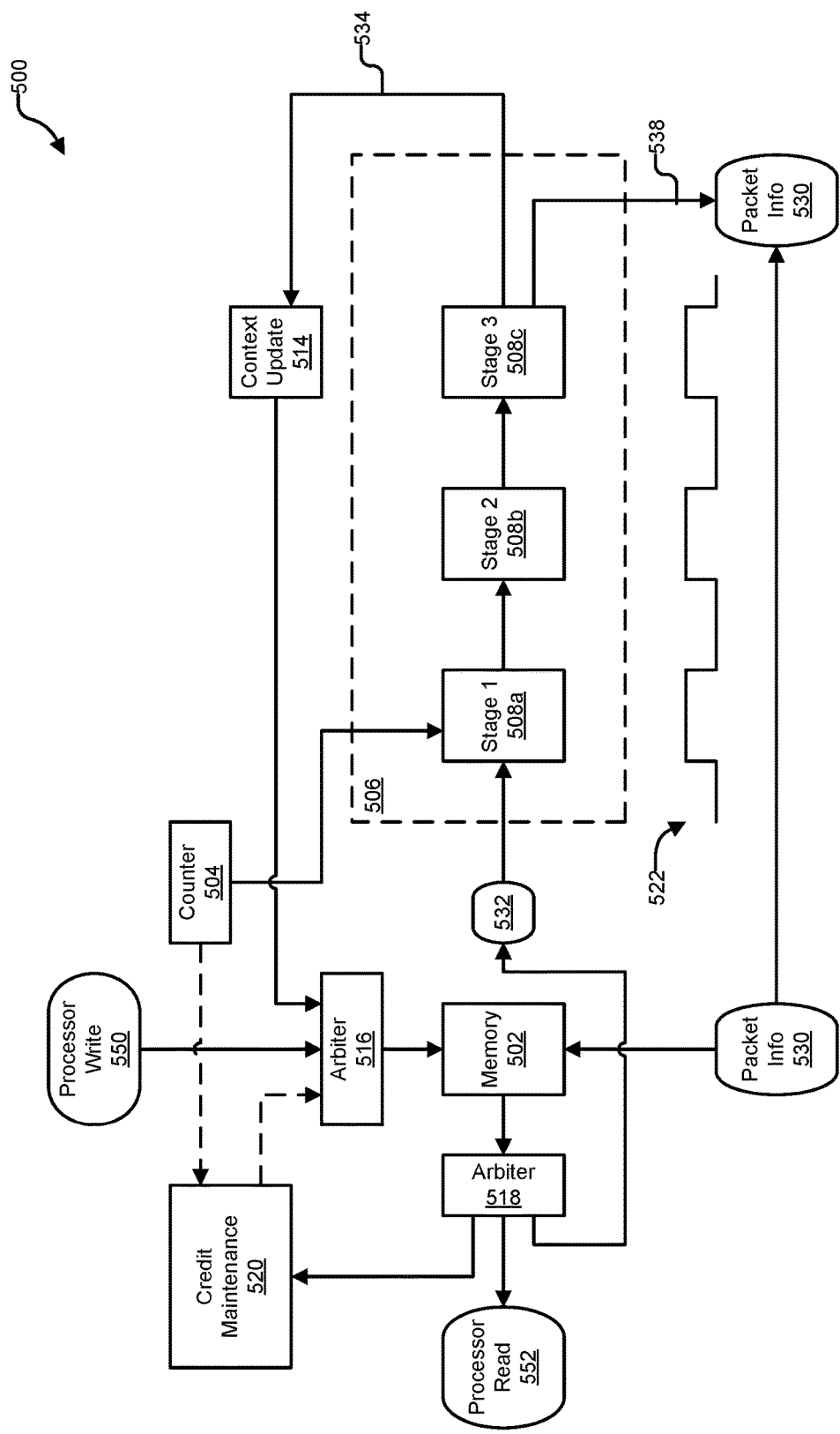
FIG. 5 illustrates an example of a circuit that includes credit maintenance logic that may maintain the credit counts for the policing contexts stored in a memory.

FIG. 5 illustrates an example of a circuit 500 that includes credit maintenance logic 520 that may maintain the credit counts for the policing contexts stored in a memory 502. The circuit 500 may include a memory 502, a free-running counter 504, a pipeline 506 with multiple stages 508a-c, and an optional context updating logic 514. The circuit 500 may also include a write arbiter 516 and a read arbiter 518 connected to write and read ports, respectively, of the memory 502. The circuit 500 may also include credit maintenance logic 520. The circuit 500 may also have a clock input 522. The circuit 500 may include additional pipelines, but for the sake of clarity these are not illustrated here.

The memory 502 may be used to store policing contexts. Packet information 530 provided to the circuit 500 may include a policer identifier, which may be used to read a specific policing context 532 from the memory 502. The policing context 532 and the packet information 530 may be input into the first stage 508a of the pipeline 506, along with the current value of the counter 504. Each stage of the pipeline 508a-c operates on values provided by the policing context 532, the packet information 530, and the counter 504. At each cycle of the clock the data being operated on in each stage 508a-c, along with any possible results from those operations, may be advanced to the next stage 508a-c of the pipeline 506. At the last stage 508c, the drop-or-forward status for the packet described by the packet information 530 may be determined and set 538 in the packet information. The drop-or-forward status may be determined according to the process 200 illustrated in FIG. 2. In FIG. 5, the last stage 508c may also update 534 the policing context 532 by writing some or all of the values for the policing context back into the memory 502. In some implementations, an optional context updating logic 514 may collect the updated policing context 532 data from multiple pipelines and produce a single write request for the memory 502.

The credit maintenance logic 520 may read policing contexts from the memory 502 to update the credits counts for one or more buckets tracked by each policing context. The credit maintenance logic 520 may read a policing context from the memory 502 and determine whether the policing context should be updated. The credit maintenance logic 520 may then cause the policing context to be updated, so that the credit count in the policing context stays accurate. In some implementations, the credit maintenance logic 520 may check how much time has passed since a policing context has been used, for example by comparing a previous counter value tracked by the policing context with the current counter value. In these implementations, the credit maintenance logic may only cause an update of the credit counts for the policing context when the difference between the current counter value and the previous counter value is greater than a pre-determined interval. In some implementations, the credit maintenance logic 520 may cause all policing contexts to be updated.

In most cases, the operation of the credit maintenance logic 520 is lower in priority than the processing of packet information by the pipeline 506. In these cases, credit maintenance may be delayed until the pipeline 506 is idle, or may otherwise be disabled when the pipeline 506 is busy.

In some implementations, the credit maintenance logic 520 may wait a fixed interval of time, and then do credit maintenance on one or more policing contexts. For example, in some implementations, the credit maintenance logic 520 may activate at every half period of the counter 504, that is, whenever half the maximum value of the counter 504 has passed. Alternatively or additionally, the credit maintenance logic 520 may activate at intervals just less than the maximum counter value (e.g., the maximum counter value minus one, two, or five, or some other value). The credit maintenance logic 520 need only activate frequently enough to avoid the counter 504 rolling over for any policing context. The interval at which the credit maintenance logic 520 activates may be configurable.

In some implementations, when the credit maintenance logic 520 activates, it may read every policing context from the memory 502, one at a time. The credit maintenance logic 520 may then, first, determine whether the policing context is enabled, and then, second, may cause a "dummy" packet—that is, zero-size packet—to be sent through the pipeline 506. When the credit maintenance logic 520 determines that the credit counts tracked by a policing context need to be updated, the credit maintenance logic 520 may cause the policing context 532 to be read from the memory 502, and sent into the pipeline 506. The credit maintenance logic 520 may also manufacture packet information 530 to send into the pipeline 506, with the packet size set to zero. In most cases, this dummy packet is sent through the pipeline 506 when the pipeline has experienced an idle cycle, that is, a cycle where no new packet information was received. Additionally, in most cases, dummy packets may be delayed when packet information has been received. In these implementations, the pipeline's 506 ability to calculate new credits accrued and add these to the bucket may be used to update the policing context's 532 buckets. In these implementations, the credit maintenance logic 520 need not execute this calculation, and also need not write to the memory 502.

In some implementations, instead of using dummy packets in the pipeline to update policing contexts that require maintenance, the credit maintenance logic 520 may itself update the credit counts for some or all of the buckets tracked by the policing context. Having read a policing context, the credit maintenance logic 520 may, using the counter 504, determine how many credits have accrued since the last time the policing context was used. The credit maintenance logic 520 may then determine a next number of credits available, and write the policing context back into the memory 502. In these implementations, the circuit 500 may include logic that ensures that a policing context is not written by the credit maintenance logic 520 at the same time that the same policing context is being read for use in the pipeline. For example, when the credit maintenance logic 520 attempts to write a policing context that is being read in the same clock cycle, the write from the credit maintenance logic 520 may be delayed until the next clock cycle. Alternatively or additionally, the write from the credit maintenance logic 520 may be canceled. In some implementations, policing contexts that are not updated are not written back into the memory 502.

The circuit 500 may include a read arbiter 518 to arbitrate between read requests from different sources, including the credit maintenance logic 520. Read request may also come from a processor 552 and/or from the circuit 500 itself. The processor 552 read requests may read values from policing contexts, for example, determine the current state of a bucket, or determine the state of the policing context. Read requests originating in the circuit 500 may occur when new packet information 530 is received. These read requests typically cause the policing context 532 identified by the packet information 530 to be read and sent into the pipeline 406 for processing along with the packet information 530.

In most implementations, the read arbiter 518 may give highest priority to read requests from the circuit 500, so as to avoid delaying processing of packet information. In some implementations, read requests from the credit maintenance logic 520 may receive second highest priority, so that the credit counts in the policing contexts remain accurate. In some implementations, read requests from the processor 552 are given lowest priority, to avoid these requests interfering with the normal operation of the circuit 500.

The circuit 500 may also include a write arbiter 516 to arbitrate between write requests from different sources, including the credit maintenance logic 520. Write requests may come from a processor 550 and/or from the pipeline 506. The processor 550 write requests may write modified information for a policing context to the memory 502. For example, a processor 550 write request may modify, for a policing context, the maximum credits allowed in a bucket. Write requests from the pipeline 506 may update the current state of a bucket based on the drop-or-forward status of a packet. For example, a write request from the pipeline 506 may update a policing context to indicate credits added and subtracted from a bucket.

In some implementations, the write arbiter 516 may determine which write requests from various sources may be allowed to proceed to the memory 502. For example, when the pipeline 506 and the credit maintenance logic 520 are requesting to write to the same policing context, the write request from the credit maintenance logic 520 may be all or partially discarded, because the write request from pipeline 506 may have the most up-to-date values for the policing context. As another example, a write request from the processor 550 may be allowed to proceed first, because updated values from the processor 550 write request may need to be written to the memory 502 as soon as possible.

A policer circuit 500 with credit maintenance logic 520 may thus be able to maintain up-to-date credit information in policing contexts that are infrequently used. The circuit 500 may also include a write arbiter 516 and a read arbiter 518 to manage write and read requests, respectively, from different sources and targeted to the memory 502.

Figure 6:
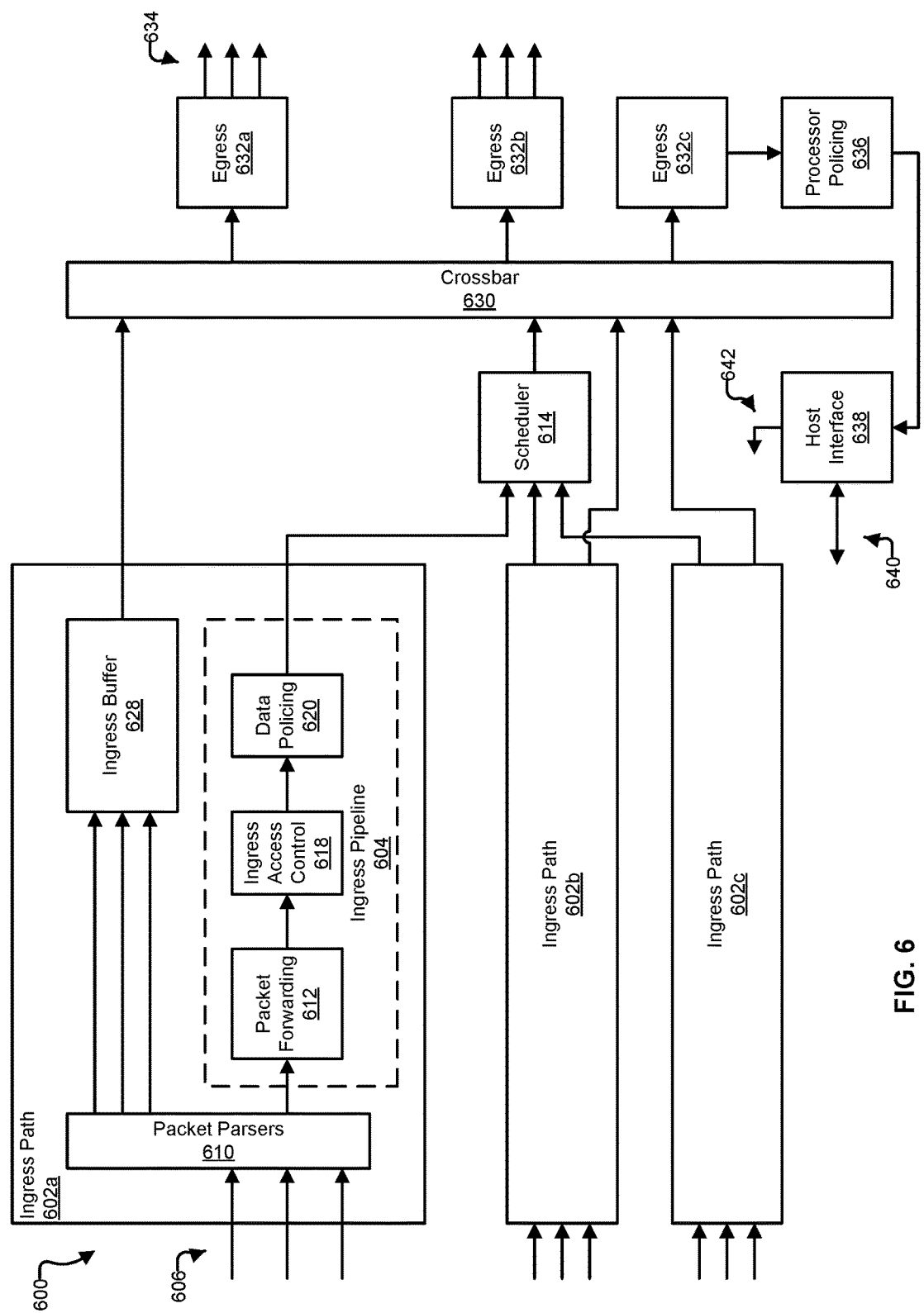
FIG. 6 illustrates an example of a switch circuit that may include one or more instances of a policer circuit.

FIG. 6 illustrates an example of a circuit 600 that may include one or more instances of a policer circuit. The circuit 600 in this example implements a switch. The illustrated switch circuit 600 may be used in switches and routers in a network. The network may provide a fabric connecting compute and storage servers in, for example, an enterprise network, a public network, a data center, and/or a cloud servicer provider, among others. The switch circuit 600 may be configured to route packets received over a number of ingress links 606 to a number of egress links 634. The switch circuit 600 may also be configured to drop certain packets. The switch circuit 600 may include one or more ingress paths 602a-c, a crossbar circuit 630, one or more egress paths 632a-c, and a host interface 638. The switch circuit 600 may include more or fewer modules than are illustrated here. Additionally, some or all of the illustrated modules may be combined into fewer modules, and/or may be divided into multiple sub-modules.

Each ingress path 602a-c may include a number of ingress links 606. For example, in some implementations, each ingress path 602a-c may include eight MAC units, and thus may support eight ingress links 606 to the network. Each ingress link 606 may include a physical interface that connects the circuit to the network. The switch circuit 600 may include multiple ingress paths 602a-c. For example, in one implementation, the circuit 600 includes sixteen instances of the ingress path 602a-c. In this implementation, the switch 600 may support up to 128 links, with eight links per ingress path 602a-c. An example of the internal modules of the ingress paths 602a-c is illustrated for the first ingress path 602a. It may be assumed that the internal workings of each ingress path 602a-c may be identical.

The links 606 for the first ingress path 602a may be connected to a number of parsers 610. The parsers 610 may process incoming packets and extract key fields, such as source and destination addresses, receiving and transmitting port numbers, a packet size, the size and type of the packet's headers, the packet's type or class, and/or any other information that may be found in a packet header. The parser 610 may place the extracted data into a block of data called metadata, which may also be referred to as packet information.

The parsers 610 may pass the data for the packets to an ingress buffer 628, and their accompanying packet information to an ingress pipeline 604. The ingress pipeline 604 may determine how and/or where a packet is to be routed, and/or whether a packet should be dropped The ingress pipeline 604 typically receives the packet information for a packet, while the packet itself moves to the ingress buffer 628. In most cases, the packet information occupies fewer bytes than the packet itself, and so the packet information functions as an easier-to-handle proxy for the packet. In various implementations, the ingress pipeline 604 includes packet forwarding logic module 612, an ingress access control 618 module, and a data policing 620 module. The packet information for a packet may be processed by each successive stage of the ingress pipeline 604, with each stage possibly modifying values, removing values, and/or adding values to the packet information.

The packet forwarding module 612 may determine how or where a packet should be routed. The packet forwarding module 612 may, for example, look up source and destination addresses in routing tables, examine port numbers, check values indicating the lifespan of the packet, and may modify the packet information for a packet to direct the packet to a specific egress link 634. In some cases, the packet forwarding module 612 may determine that a packet should be dropped, and may so indicate in the packet's packet information.

The ingress access control 618 module may operate to filter packets, and may include forwarding rules. The ingress access control 618 module may filter, selectively forward, and/or redirect packets passing through the ingress pipeline 604. For example, some packets may be filtered based on the packet's protocol, type, and/or class, with packets that do not pass the filter being marked for dropping, or being marked for sending to a processor. The ingress access control 618 may also set a policer identifier for processor policing and/or data policing in a packet's packet information.

The data policing 620 module may implement a policer circuit according to any of FIG. 1, 3, 4, or 5. The data policing 620 module of FIG. 6 may control the rate of packet flows being routed by the switch circuit 600. As noted above, in some implementations, the ingress access control 618 module may set a policer identifier in the packet information that describes a packet. Setting a policer identifier may enable rate limiting by the data policing 620 module. Packet information that does not include a policer identifier may pass through the data policing 620 module without being policed. The same may be the case for packet information that includes a drop-or-forward status that is set to "drop." Packets that are policed by the data policing 620 module may have their drop-or-forward status in their packet information set by the data policing 620 module.

The packet information for a packet may be sent from the ingress path 602a to a scheduler 614. The scheduler 614 may receive the packet information from each of the ingress paths 602a-c. The data for the packet may, at around the same time, be sent to the crossbar 630. Each of the ingress paths 602a-c may send packets to the crossbar 630, usually but not always in time with sending associated packet information to the scheduler 614. The scheduler 614 may manage transmission of packets across the crossbar 630. In some cases, packets may have sufficient information on their own for the crossbar 630 to direct the packets to the proper egress path 632a-c. In other cases, the scheduler 614 may direct the crossbar 630, and control which egress path 631a-c a packet goes to. The scheduler 614 may also direct the crossbar 630 to drop certain packets. For example, when the drop status in the packet information for a packet indicates that a packet is to be dropped, then the scheduler 614 may direct the crossbar 630 to not forward the packet to an egress path 632a-c. Packets forwarded to the egress paths 632a-c may subsequently be directed to an appropriate egress link 634.

Packets that are marked to be forwarded to a processor may be directed by the crossbar 630 to an egress path 632c designated for packets being sent to a processor. The designated egress path 632c may send packets to a processor policing 636 module. This processor policing 636 module may implement a policer circuit according to any of FIG. 1, 3, 4, or 5. In this case, the packet policing module 636 of FIG. 6 may police packets that are being sent to one or more processors, and thereby protect the processor or processors from being flooded with packets.

Packets that the packet policing 636 module allows through to a processor may be sent to a host interface 638 module. The host interface 638 module may manage communication with one or more processors or processor cores. The processor or processors may be in the same circuit that includes the switch circuit 600, may be in the same package, may reside on the same board, and/or may be in the same chassis. The host interface 638 may receive read and write requests from a processor over an interface 640 to the processor. The host interface 638 may also have an interface 642 that connects to some or all of the modules in the switch circuit 600. This interface 642 provides a processor access to the modules, which the processor may use to configure the modules and/or to read information from the modules.

Packets directed to a processor may also be sent to the processor using the host interface's 638 interface 640 to the processor.

II. Methods

Figure 7:
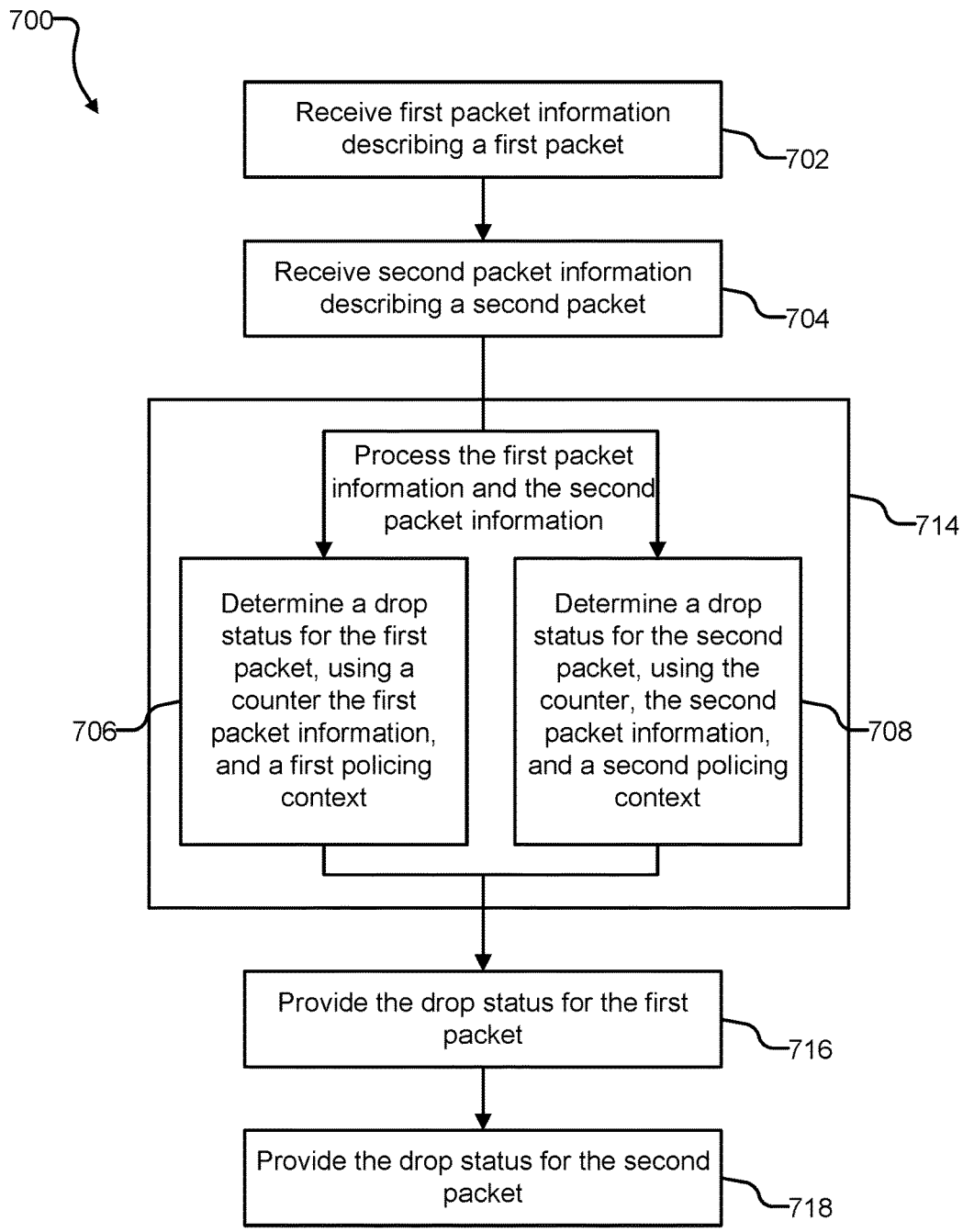
FIG. 7 illustrates an example of a process for concurrently determining the drop-or-forward status for more than one packet.
Figure 8:
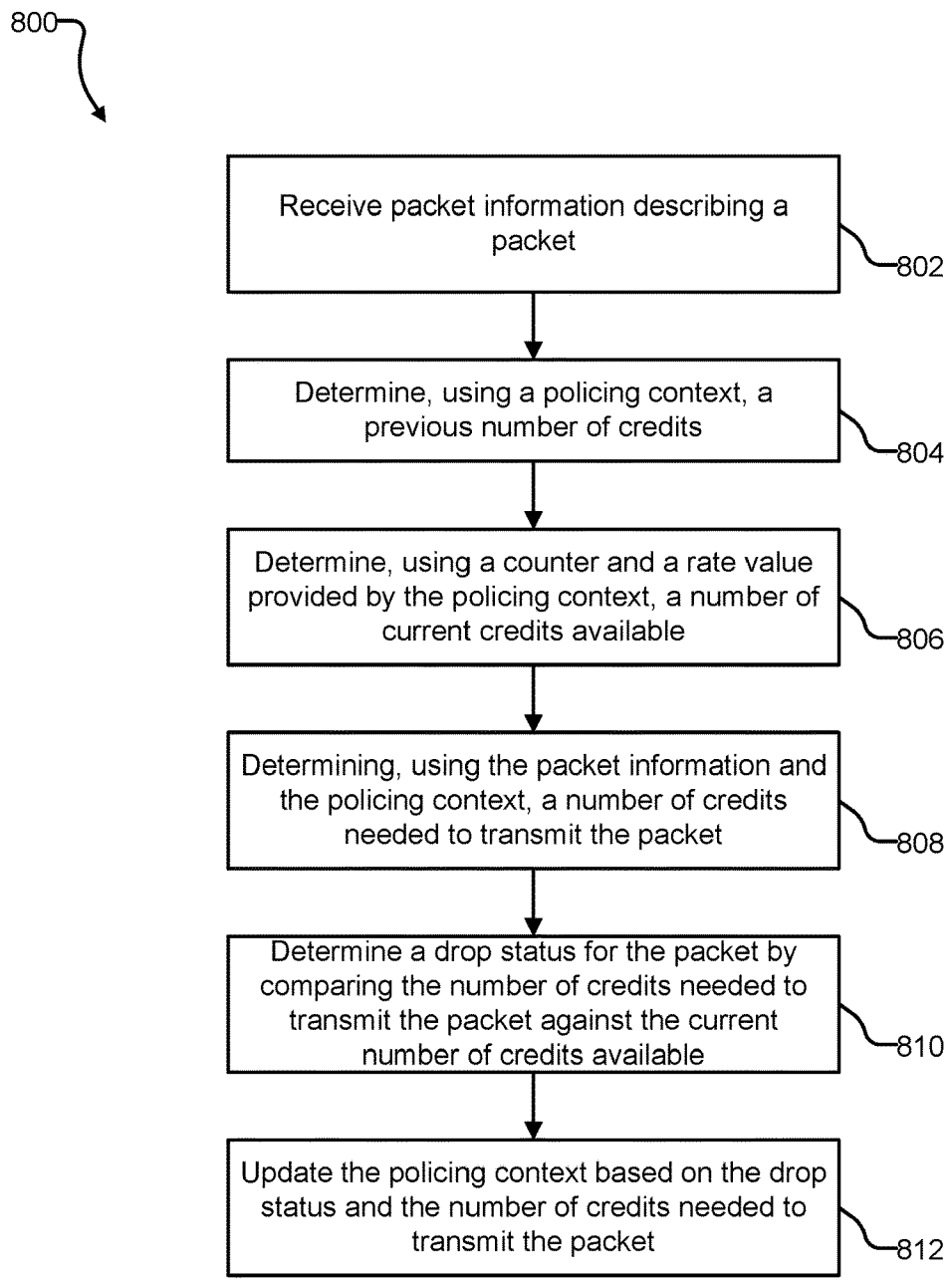
FIG. 8 illustrates an example of a process for cycle-accurate determination of the credits available for transmitting a packet.
Figure 9:
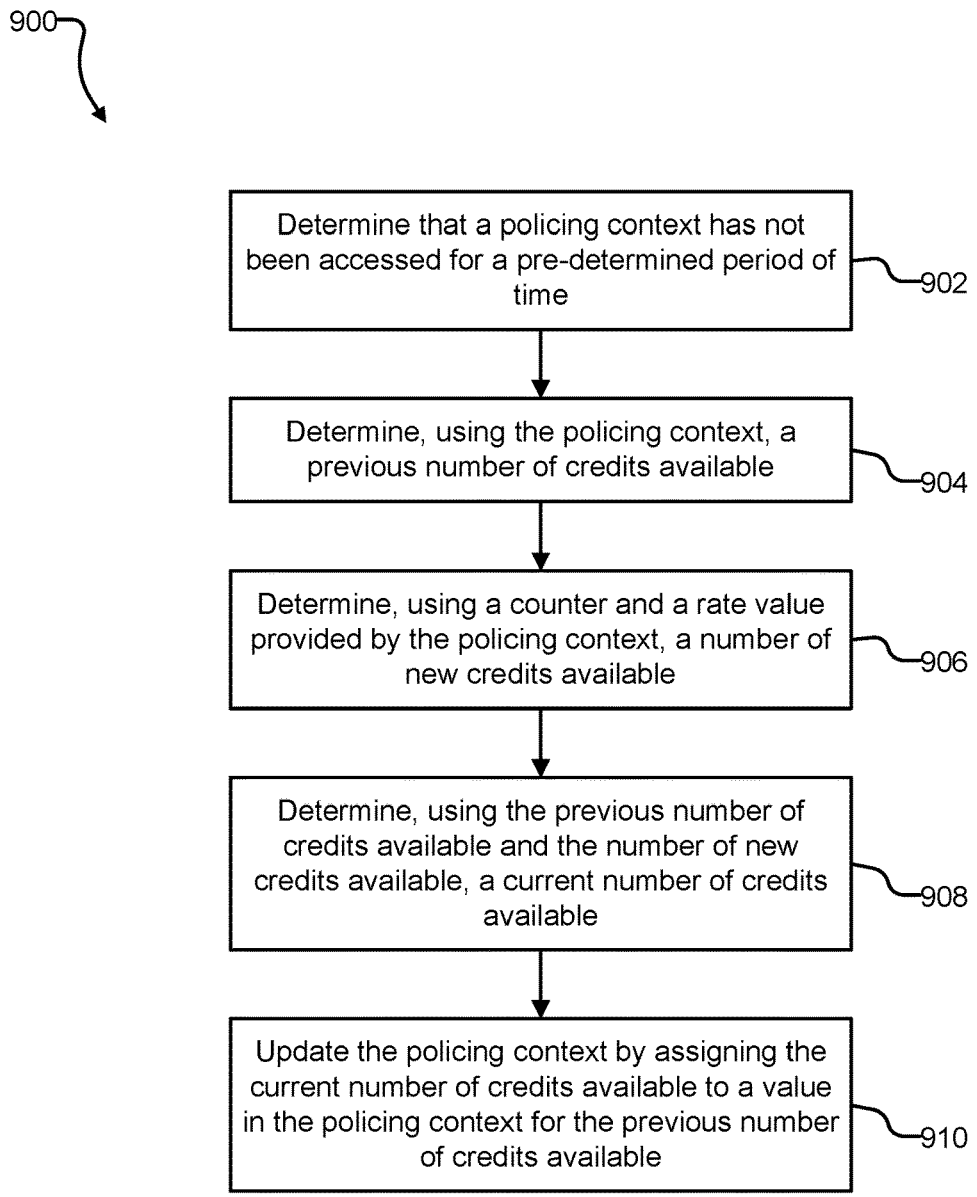
FIG. 9 illustrates an example of a process for maintaining the credits in policing contexts that may not have been used for some time.

FIGS. 7-9 illustrate examples of processes for various aspects included in packet policing, that is, limiting the rate at which a flow of packets are allowed to traverse a network. These methods may be implemented by the systems described above, such as for example the example circuits illustrated in FIGS. 1, 3, 4, and 5. The steps for each example process are illustrated for ease of understanding, and the individual steps may be executed in an order other than the order given, may include additional steps, and/or may be combined into fewer steps.

FIG. 7 illustrates an example of a process 700 for concurrently determining the drop-or-forward status for more than one packet. The example process 700 may be executed by a method for packet policing, implemented for example in an integrated circuit.

At step 702, the packet policer may receive a first packet information describing first packet. The first packet information may include information about the packet, such as for example source and destination addresses, transmitting and receiving port numbers, a packet class or type, and so on.

After receiving the first packet information, the packet policer may, at step 704, receiving a second packet information describing a second packet. The second packet information may include similar information, for a second packet, as is included in the first packet information.

At step 714, the packet policer may process the first packet information concurrently with processing the second packet information. The first packet information may be processed at step 706 while the second packet information may be processed at step 708.

At step 706, the packet policer may determine, using a pipeline, a drop status for the first packet. The drop status for the first packet may be determined using a counter, the first packet information, and a first policing context. The first policing context may be provided by a memory, which may be read using a policer identifier included in the first packet information. The first policing context may include values for limiting the rate at which packets that are assigned to the first policing context are forwarded. The first policing context may further include information for tracking the credits in a bucket, where the credits determine whether the packet should be forwarded or dropped.

Determining the drop status for the first packet may include determining a new number of credits accrued. This determination may be made using a previous counter value provided by the first policing context and a current counter value provided by a counter. The difference between the current counter value and the previous counter value may be multiplied by a credits per count value (provided by the first policing context), with the result being the new number of credits accrued to the bucket.

Determining the drop status for the first packet may also include determining a current number of credits in the bucket. The current number of credits may be the sum of a previous number of credits, provided by the first policing context, and the new number of credits. The first policing context may have a maximum number of credits allowed for the bucket. In some cases, when the sum of the previous number of credits and the new number of credits exceeds the maximum number of allowed credits, the current number of credits is set to the maximum number of credits, and any additional credits are thrown away.

Determining the drop status for the first packet may also include determining a number of credits needed to transmit the packet. The first policing context may provide that the packets being policed by the first policing context are to be limited to a certain number of bytes per second. In this case, a size of the packet, provided by the first packet information, may be multiplied by a rate value (in bytes per credit) provided by the first policing context. The resulting product may be the number of credits needed to transmit the packet. Alternatively, the first policing context may be configured for packets to be limited to a certain number of packets per second. In this case, the number of credits needed to transmit the packet may be provided by a rate value (in packets per credit) provided by the first policing context.

Determining the drop status for the first packet may also include comparing the credits needed to transmit the packet against the current number of credits in the bucket. When the current number of credits in the bucket is greater than or equal to the number of packets needed to transmit the packet, the drop status of the packet may be set to "forward;" otherwise, the drop status may be set to "drop." The drop status may be set into the first packet information to be used later to drop the packet.

After determining the drop status for the first packet, the packet policer may also update the first policing context. For example, when the first packet is to be forwarded, the number of credits needed to transmit the packet may be deducted from the bucket, and the resulting next number of credits in the bucket may be stored for the first policing context. As another example, when the first packet is to be dropped, the current number of credits, which includes the new credits accrued, may be stored for the first policing context. As another example, the current counter value may be stored for the first policing context, to be used later as the previous counter value.

Concurrent with determining a drop status for the first packet, the packet policer may determine, using the pipeline, a drop status for the second packet, at step 708. The drop status for the second packet may be determined using the counter, the second packet information, and a second policing context. The packet policer may determine the drop status for the second packet using the same calculations used for the first packet, substituting in each step an appropriate current counter value associated with the second packet, values provided by the second packet information, and values provided by the second policing context. The steps for determining the drop status for the second packet may occur concurrent with the steps for determining the drop status for the first packet.

In some cases, the first policing context may be the same as the second policing context. For example, the second packet information may include the same policer identifier that is included in the first packet information. In these cases, the drop status for the second packet may be determined using a next number of credits provided upon determining the drop status for the first packet. The next number of credits may indicate the result of deducting credits from the bucket when the first packet is to be forwarded, or only the new credits added to the bucket when the first packet is to be dropped.

After processing both the first and the second packet information at step 714, the packet policer may next, at step 716, provide the drop status for the first packet. Subsequent to providing the drop status for the first packet, the packet policer may then, at step 718, provide the drop status for the second packet.

FIG. 8 illustrates an example of a process 800 for cycle-accurate determination of the credits available for transmitting a packet. The example process 800 may be executed by a method for packet policing, implemented for example in an integrated circuit.

At step 802, the packet policer may receive packet information describing a packet. The packet information include information about the packet such as source and destination addresses, the network protocol or protocols of the packet, and a packet size, among other things. The packet itself is not received.

At step 804, the packet policer may determine, using a policing context, a previous number of credits. The policing context may be stored in a memory in the packet policer. The policing context may be read from the memory using a policer identifier included in the packet information. The previous number of credits may be stored in the policing context. The previous number of credits describes the number of credits in a bucket that is being tracked by the policing context. The previous number of credits value indicates the number of credits in the bucket after the last time this particular policing context was used.

At step 806, the packet policer may determine, using a counter and rate value provided by the policing context, a current number of current credits available. The counter may be a free-running counter included in the packet policer. The counter may increment at every cycle of a clock. The rate value may be the number of credits accrued to the bucket for every count of the counter. For example, the rate may be one credit per count. The counter may further be used to determine how much time has passed since the last time this particular policing context was used. For example, the policing context may include a previous counter value, which stores the value the counter had the last time this policing context was used. The previous counter value can be compared against the current counter value to determine how many times the counter has incremented. The number of times the counter has incremented may then be multiplied by the number of credits accrued per count to provide the total number of new credits accrued to the bucket.

Furthermore, at step 806, the current number of credits available to transmit the packet described by the packet information may be determined using the number of new credits accrued and the previous number of credits. The sum of these values provides the current number of credits available in the bucket.

At step 808, the packet policer may determine, using the packet information and the policing context, a number of credits needed to transmit the packet. The policing context may provide a rate type and a number of credits that the packet may be worth. For example, when the rate type is in packets per second, the policing context may provide that one packet is worth one credit or ten credits, or some other value. As another example, when the rate type is in bytes per second, the packet information may provide that the packet is worth the packet's size times a credits per byte value. The packet's size may be provided by the packet information.

At step 810, the packet policer may determine a drop status for the packet by comparing the number of credits needed to transmit the packet, provided by step 808, against the current number of credits available, provided by step 806. When the current number of credits available is greater than or equal to the number of credits needed to transmit the packet, the drop status for the packet will be set to "forward" in the packet information for the packet. Otherwise, the drop status will be set to "drop."

At step 812, the packet policer may update the policing context based on the drop status and the number of credits needed to transmit the packet. When the packet is to be forwarded, the number of credits needed to transmit the packet may be subtracted from the bucket to provide a next number of credits available. The next number of credits available may be stored with the policing context to be used as the previous number of credits available the next time the policing context is used. When the packet is to be dropped, no credits will be deducted from the bucket, but the current number of credits available may reflect the new credits added. Thus the current number of credits available may be stored with the policing context as the next number of credits available, to be used as the previous number of credits available the next time the policing context is used.

FIG. 9 illustrates an example of a process 900 for maintaining the credits in policing contexts that may not have been used for some time. The example process 900 may be executed by a method for packet policing, implemented for example in an integrated circuit.

At step 902, the packet policer may determine that a policing context has not been accessed for a pre-determined period of time. When the policing context has not been access for some time, it may be possible that a counter used to add credits to any buckets tracked by the policing context may roll over. When this occurs, the next time the policing context is used the number of new credits added to the buckets may be inaccurate. The pre-determined period of time may be based on the maximum value of a fixed-width counter. For example, the pre-determined period of time may be half the maximum value of the counter. As another example, the pre-determined period of time may be slightly less (e.g., 1, 2, 5, 10 or some other small number) than the maximum value of the counter. At step 902, the packet policer may also determine whether the policing context is enabled.

At step 904, the packet policer may determine, using the policing context, a previous number of credits available. The previous number of credits available may indicate how many credits are in a bucket, where the bucket is tracked by the policing context.

At step 906, the packet policer may determine, using a counter and a rate value provided by the policing context, a number of new credits available. The counter may be a free-running counter that increments on every cycle of clock. The packet policer may compare the current value of the counter against a previous counter value tracked by the policing context. The difference may then be multiplied by the rate value. The rate value may indicate how many credits each count of the counter is worth. The resulting product may be a number of new credits that can be added to the bucket.

At step 908, the packet policer may determine, using the previous number of credits available and number of new credits available, a current number of credits available. The current number of credits available may be the sum of the previous number of credits available and the number of new credits available. This sum may reflect the total number credits currently available in the bucket.

At step 910, the packet policer may update the policing context by assigning the current number of credits available to a value in the policing context for the previous number of credits available. The current number of credits available reflects the current number of credits in the bucket, included credits added due to the passage of time. The previous number of credits available may be used the next time this policing context is used, as an indicator of the number of credits in the bucket after the last time the policing context was used. Hence, the current number of credits available is stored in the value reflecting the previous number of credits available. In this way, the credit count tracked by the policing context can be kept accurate.

The processes 700, 800, 900 described above may provide a packet policing circuit with the ability to police multiple packets at the same time. Furthermore, when multiple packets are being policed at the same time, two or more of these packets may use values from the same policing context. The packet policer may also be able to modify the information stored for a policing context in a memory, while at the same time using values from that policing context to police one or more packets. The packet policer may also be able to maintain a cycle-accurate count of available credits for each bucket tracked by a policing context. A counter may be provided to assist in calculating new credits accrued to the buckets. The packet policer may further manage possible roll overs of the counter by occasionally updating the credit counts in the policing context. In this way, the packet policer may maintain the accuracy of the credit counts.

III. Computing Systems

Figure 10:
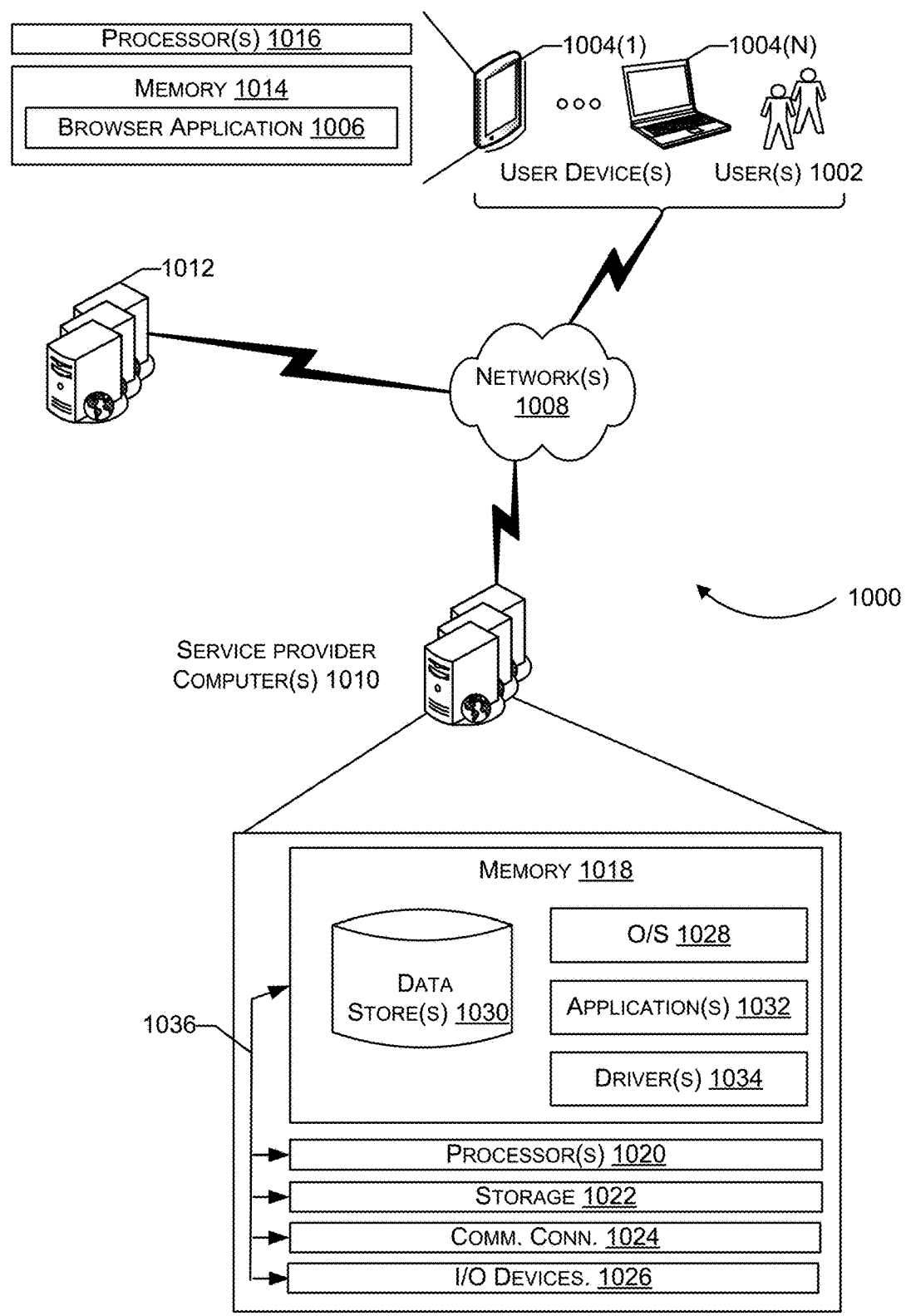
FIG. 10 illustrates an example architecture for features and systems described herein that includes one or more service provider computers and/or a user device connected via one or more networks, according to some embodiments.

FIG. 10 illustrates an example architecture 1000 for features and systems described herein. The example architecture 1000 includes one or more service provider computers 1010 and/or user devices 1004 connected via one or more networks 1008. The devices discussed above may use one or more components of the computing devices described in FIG. 10, or may represent one or more computing devices described in FIG. 10, or may be used in one or more of the computing devices described.

In the illustrated architecture 1000, one or more users 1002 may use user computing devices 1004(1)-(N) to access an application 1006 (e.g., a web browser or mobile device application), via one or more networks 1008. In some aspects, the application 1006 may be hosted, managed, and/or provided by a computing resources service or service provider. One or more service provider computers 1010 may provide a native application that is configured to run on the user devices 1004, which user(s) 1002 may interact with. The service provider computer(s) 1010 may, in some examples, provide computing resources such as, but not limited to, client entities, low latency data storage, durable data storage, data access, management, virtualization, cloud-based software solutions, electronic content performance management, and so on. The service provider computer(s) 1010 may also be operable to provide web hosting, data-basing, computer application development and/or implementation platforms, combinations of the foregoing or the like to the user(s) 1002. The service provider computer(s) 1010, in some examples, may communicate with one or more third party computers 1012.

In some examples, network(s) 1008 may include any one or a combination of many different types of networks, such as cable networks, the Internet, wireless networks, cellular networks and other private and/or public networks. While the illustrated example represents the user(s) 1002 accessing an application 1006 over the network(s) 1008, the described techniques may equally apply in instances where the user(s) 1002 interact with the service provider computer(s) 1010 via user device(s) 1004 over a landline phone, via a kiosk or in some other manner. The described techniques may also apply in other client/server arrangements (e.g., set-top boxes, etc.), as well as in non-client/server arrangements (e.g., locally stored applications, etc.).

As described above, the application 1006 may allow the user(s) 1002 to interact with the service provider computer(s) 1010 to, for example, access web content (e.g., web pages, music, video, etc.). The service provider computer(s) 1010, which may be arranged in a cluster of servers or as a server farm, may host the application 1006 and/or cloud-based software services. Other server architectures may also be used to host the application 1006. The application 1006 may be capable of handling requests from many users 1002 and serving, in response, various item web pages, for example. The application 1006 can provide any type of website that supports user interaction, including social networking sites, online retailers, informational sites, blog sites, search engine sites, news and entertainment sites, and so forth. As discussed above, the described techniques can similarly be implemented outside of the application 1006, such as with other applications running on the user device(s) 1004.

The user device(s) 1004 may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) 1004 may be in communication with the service provider computer(s) 1010 via the network(s) 1008, or via other network connections. Additionally, the user device(s) 1004 may be part of the distributed system managed by, controlled by, or otherwise part of the service provider computer(s) 1010 (e.g., a console device integrated with the service provider computers 1010).

In one example configuration, a user device(s) 1004 may include at least one memory 1014 and one or more processing units (or processor(s) 1016). The processor(s) 1016 may be implemented in hardware, computer-executable instructions, firmware, or combinations thereof. Computer-executable instruction or firmware implementations of the processor(s) 1016 may include computer-executable or machine-executable instructions written in any suitable programming language to perform the various functions described. The user device(s) 1004 may also include geo-location devices (e.g., a global positioning system (GPS) device or the like) for providing and/or recording geographic location information associated with the user device(s) 1004.

The user device memory 1014 may store program instructions that are loadable and executable on the user device processor(s) 1016, as well as data generated during the execution of these programs. Depending on the configuration and type of the user device(s) 1004, the user device memory 1014 may be volatile (such as random access memory (RAM)) and/or non-volatile (such as read-only memory (ROM), flash memory, etc.). The user device(s) 1004 may also include additional removable storage and/or non-removable storage including, but not limited to, magnetic storage, optical disks, solid state disks, flash memory, and/or tape storage. The storage devices and their associated computer-readable media may provide non-volatile storage of computer-readable instructions, data structures, program modules, and other data for the computing devices. In some implementations, the memory 1014 may include multiple different types of memory, such as static random access memory (SRAM), dynamic random access memory (DRAM), or ROM.

Turning to the contents of the user device memory 1014 in more detail, the memory 1014 may include an operating system and one or more application programs or services for implementing the features disclosed herein. The one or more application programs or services may include at least a user provided input element or electronic service web page, such as a browser application 1006 or dedicated applications (e.g., smart phone applications, tablet applications, etc.). The browser application 1006 may be configured to receive, store and/or display a website or other interface for interacting with the service provider computer(s) 1010. Additionally, the memory 1014 may store access credentials and/or other user information such as for example, user IDs, passwords and/or other user information. In some examples, the user information may include information for authenticating an account access request. Such information includes, for example, a device ID, a cookie, an IP address, a location, or the like. In addition, the user information may include a user-provided response to a security question or a geographic location obtained by the user device 1004.

In some aspects, the service provider computer(s) 1010 may include computing devices such as for example a mobile phone, a smart phone, a personal digital assistant (PDA), a laptop computer, a desktop computer, a netbook computer, a server computer, a thin-client device, a tablet computer, a gaming console, etc. Additionally or alternatively, in some embodiments, the service provider computer(s) 1010 may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. In some examples, the service provider computer(s) 1010 may be in communication with the user device(s) 1004 and/or other service providers via the network(s) 1008, or via other network connections. The service provider computer(s) 1010 may include one or more servers, perhaps arranged in a cluster, as a server farm, or as individual servers not associated with one another. These servers may be configured as part of an integrated, distributed computing environment.

In one example configuration, the service provider computer(s) 1010 may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the service provider computer(s) 1010, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support a service provider computer's 1010 basic functions, such as scheduling tasks, executing applications, and/or controller peripheral devices. In some implementations, a service provider computer 1010 may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices 1004. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The application programs 1032 include programs may include programs accessible to user devices 1004 over the network(s) 1008. Examples of such programs include word processing programs, accounting programs, media players, image editing programs, games, and so on. The application programs 1032 may alternatively or additionally include programs executing in a clustering or distributed environment, that is, applications executing cooperatively between multiple server provider computers 1010.

The drivers 1034 include programs that may provide communication between components in a server provider computer 1010. For example, some drivers 1034 may provide communication between the operating system 1028 and additional storage 1022, communication connections 1024, and/or I/O device 1026. Alternatively or additional, some drivers 1034 may provide communication between application programs 1032 and the operating system 1028, and/or application programs 1032 and peripheral devices accessible to the service provider computer 1010. In many cases, the drivers 1034 may include drivers that provide well-understood functionality (e.g., printer drivers, display drivers, hard disk drivers). In other cases, the drivers 1034 may proprietary or specialized functionality.

The service provider computer(s) 1010 or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the service provider computer(s) 1010 or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018, the additional storage 1022, both removable and non-removable, are examples of computer-readable storage media. For example, computer-readable storage media may include volatile or non-volatile, removable or non-removable media implemented in a method or technology for storage of information, the information including for example computer-readable instructions, data structures, program modules, or other data. The memory 1018 and the additional storage 1022 are examples of computer storage media. Additional types of computer storage media that may be present in the service provider computer(s) 1010 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the service provider computer(s) 1010. Computer-readable media also includes combinations of any of the above media types.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The service provider computer(s) 1010 may also contain communications connection(s) 1024 that allow the service provider computer(s) 1010 to communicate with a stored database, another computing device or server, user terminals and/or other devices on the network(s) 1008. The service provider computer(s) 1010 may also include I/O device(s) 1026, such as a keyboard, a mouse, a pen, a voice input device, a touch input device, a display, speakers, a printer, and the like. The communication connection(s) 1024 and I/O device(s) 1026, along with the storage 1022, may be described as peripheral devices.

The service provider computer(s) 1010 may also include one or more communication channels 1036. A communication channel 1036 may provide a medium over which the various components of the service provider computer 1010 can communicate. The communication channel or channels 1036 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

Figure 11:
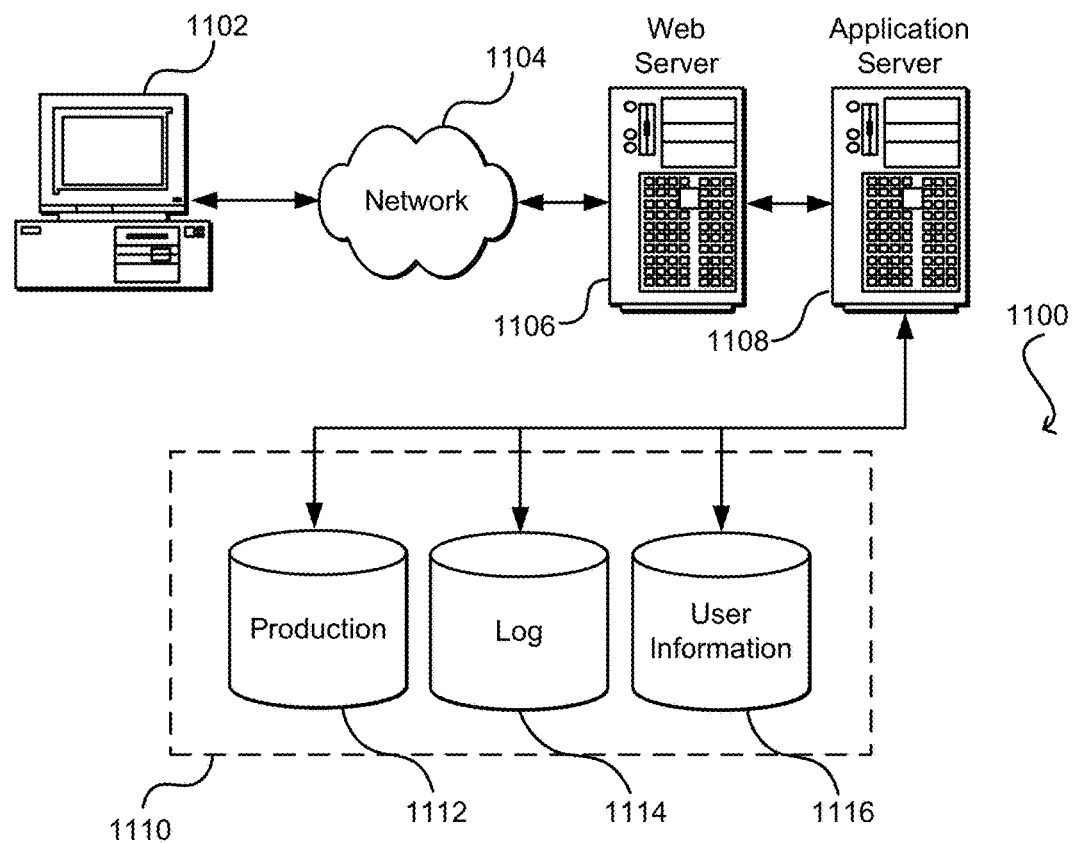
FIG. 11 illustrates aspects of an example environment of a computing system for implementing aspects in accordance with some embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include an appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server 1106. It should be understood that the Web 1106 and application servers 1108 are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store 1110 illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store 1110, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store 1110 might access the user information 1116 to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server 1106, 1108 typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
   a memory configured to store a plurality of policing contexts, each policing context including a previous number of credits available, a rate value, and a credits per packet value;
   a counter; and
   a pipeline including at least two stages;
   wherein the integrated circuit is configured to, upon receiving packet information describing a packet:
      determine, using an identifier provided by the packet information, a first policing context from the plurality of policing contexts;
      determine, using the counter and a first rate value provided by the first policing context, a number of new credits available;
      determine, using the pipeline, a current number of credits available, wherein the current number of credits available is determined using a first previous number of credits available provided by the first policing context and the number of new credits available;
      determine, using the pipeline, a number of credits needed to transmit the packet, wherein the number of credits needed is determined using a packet size provided by the packet information and a first credits per unit value provided by the first policing context;
      determine, using the pipeline, a drop status for the packet, wherein determining the drop status includes comparing the number of credits needed to transmit the packet against the current number of credits available;
      update the packet information with the drop status;
      update the first number of previous credits available in the first policing context based on the drop status for the packet and on the number of credits needed to transmit the packet;
      determine that a second policing context from the plurality of policing contexts has not been accessed for a pre-determined period of time;
      determine, using the counter and a second rate value provided by the second policing context, a second number of new credits available;
      determine, using the pipeline, a second current number of credits available, wherein the second current number of credits available is determined using a second previous number of credits provided by the second policing context and the second number of new credits available; and
      update, in the memory, the second number of previous credits available for the second policing context with the second current number of credits available.

2. The integrated circuit of claim 1, wherein the drop status is to drop the packet when the current number of credits available is less than the number of credits needed to transmit the packet.

3. The integrated circuit of claim 1, wherein the drop status is to forward the packet when the current number of credits available is greater than or equal to the number of credits needed to transmit the packet.

4. The integrated circuit of claim 1, wherein the integrated circuit is further configured to update the packet information with the drop status.

5. An integrated circuit, comprising:
a memory configured to store a policing context;
a counter; and
a pipeline;
wherein the integrated circuit is configured to, upon receiving packet information describing a packet:
   determine, using the pipeline, a drop status for the packet, wherein determining the drop status includes:
      determining, from the policing context, a previous number of credits available;
      determining, using the counter and a rate value provided by the policing context, a number of new credits available;
      determining, using the previous number of credits available and the number of new credits available, a current number of credits available;
      determining, using the policing context and the packet information, a number of credits needed to transmit the packet; and
      determining the drop status for the packet, wherein determining the drop status includes comparing the number of credits needed to transmit the packet against the current number of credits available;
   update information stored for the policing context in the memory based on the drop status and the number of credits needed to transmit the packet; and
   upon determining that the policing context has not been accessed for a pre-determined period of time, update, using the pipeline, the information stored for the policing context in the memory, wherein updating the policing context includes:
      determining, from the policing context, a second previous number of credits available;
      determining, using the counter and the rate value provided by the policing context, a second number of new credits available;
      determining, using the second previous number of credits available and the second number of new credits available, a second current number of credits available; and
      updating the information stored for policing context in the memory by assigning the second current number of credits available to a value in the memory that stores the previous number of credits available for the policing context.

6. The integrated circuit of claim 5, wherein the policing context is updated when the pipeline is idle, wherein the pipeline is idle when no packet information is received.

7. The integrated circuit of claim 5, wherein the pre-determined period of time is a value that is less than a maximum value of the counter.

8. The integrated circuit of claim 5, wherein the integrated circuit further comprises a second pipeline, and wherein the integrated circuit is configured to:
   using the second pipeline, determine a second drop status for the packet, wherein determining the second drop status includes:
      determining, from the policing context, a third previous number of credits available;
      determining, using the counter and a second rate value provided by the policing context, a third number of new credits available;
      determining, using the third previous number of credits available and the third number of new credits available, a third current number of credits available;
      determining, using the policing context and the packet information, a second number of credits needed to transmit the packet; and
      determining the second drop status for the packet, wherein determining the second drop status includes comparing the second number of credits needed to transmit the packet against the third current number of credits available.

9. The integrated circuit of claim 8, wherein the integrated circuit is configured to, upon determining that the drop status is to drop the packet:
   provide the second drop status as a status for the packet; and
   update the policing context based on the second drop status and the second number of credits needed to transmit the packet.

10. The integrated circuit of claim 8, wherein the integrated circuit is configured to provide the second drop status when a value in the policing context indicates that the second drop status is to be considered.

11. The integrated circuit of claim 8, wherein the drop status and the second drop status are determined concurrently.

12. The integrated circuit of claim 5, wherein the rate value provided by the policing context is in bytes per second, bits per second, or packets per second.

13. The integrated circuit of claim 5, wherein the drop status is to drop the packet when the current number of credits available is less than the number of credits needed to transmit the packet.

14. The integrated circuit of claim 5, wherein the integrated circuit is further configured to update the packet information with the drop status.

15. The integrated circuit of claim 5, wherein the drop status is to forward the packet, and wherein the integrated circuit is configured to update the policing context by assigning a difference between the current number of credits available and the number of credits needed to transmit the packet to a value in the memory that stores the previous number of credits available for the policing context.

16. The integrated circuit of claim 5, wherein the drop status is to drop the packet, and wherein the integrated circuit is configured to update the policing context by assigning the current number of credits available to a value in the memory that stores the previous number of credits available for the policing context.

17. The integrated circuit of claim 5, wherein, when the counter reaches a maximum value, the counter is set to a minimum value.

18. The integrated circuit of claim 5, wherein the integrated circuit is an application-specific integrated circuit (ASIC) or a field-programmable gate array (FPGA).

19. A method, comprising:
   upon receiving, at an integrated circuit, packet information describing a packet, determining a drop status for the packet, wherein determining the drop status includes:
      determining, using a policing context, a previous number of credits available;
      determining, using a counter of the integrated circuit and a rate value provided by the policing context, a current number of credits available;
      determining, using the packet information, a number of credits needed to transmit the packet; and
      determining the drop status for the packet, wherein determining the drop status includes comparing the number of credits needed to transmit the packet against the current number of credits available;

updating the policing context based on the drop status and the number of credits needed to transmit the packet;

upon determining that the policing context has not been accessed for a pre-determined period of time, updating information stored for the policing context, wherein updating the policing context includes:

determining, from the policing context, a second previous number of credits available;

determining, using the counter and a second rate value provided by the policing context, a second number of new credits available;

determining, using the second previous number of credits available and the second number of new credits available, a second current number of credits available; and updating the policing context by assigning the second current number of credits available to a value in the policing context for the previous number of credits available for the policing context.

20. The method of claim 19, further comprising, concurrent with determining the drop status for the packet, determining a second drop status for the packet, wherein determining the second drop status includes:

determining, from the policing context, a third previous number of credits available;

determining, using the counter and a third rate value provided by the policing context, a third number of new credits available;

determining, using the third previous number of credits available and the third number of new credits available, a third current number of credits available;

determining, using the policing context and the packet information, a third number of credits needed to transmit the packet; and upon determining that the drop status for the packet is to drop the packet, comparing the third number of credits needed to transmit the packet against the third current number of credits available to determine the second drop status; and updating the policing context based on the second drop status and the third number of credits needed to transmit the packet.

21. The method of claim 19, wherein the rate value provided by the policing context is in bytes per second, bits per second, or packets per second.

22. The method of claim 19, further comprising updating the packet information with the drop status.

23. The method of claim 19, wherein the drop status is to forward the packet, and further comprising:

updating the policing context by assigning a difference between the current number of credits available and the number of credits needed to transmit the packet to a value in the policing context for the previous number of credits available.

24. The method of claim 19, wherein the drop status is to drop the packet, and further comprising:

updating the policing context by assigning the current number of credits to a value in the policing context for the previous number of credits available.

* * * * *